US009189385B2

(12) United States Patent
Cohen et al.

(10) Patent No.: US 9,189,385 B2
(45) Date of Patent: Nov. 17, 2015

(54) SCALABLE DATA STRUCTURES FOR CONTROL AND MANAGEMENT OF NON-VOLATILE STORAGE

(71) Applicant: SEAGATE TECHNOLOGY LLC, Cupertino, CA (US)

(72) Inventors: Earl T. Cohen, Oakland, CA (US); Timothy Lawrence Canepa, Los Gatos, CA (US)

(73) Assignee: Seagate Technology LLC, Cupertino, CA (US)

( * ) Notice: Subject to any disclaimer, the term of this patent is extended or adjusted under 35 U.S.C. 154(b) by 171 days.

(21) Appl. No.: 13/652,301

(22) Filed: Oct. 15, 2012

(65) Prior Publication Data

US 2014/0108703 A1   Apr. 17, 2014

(51) Int. Cl.
   *G06F 12/00* (2006.01)
   *G06F 12/02* (2006.01)
   *G06F 3/06* (2006.01)

(52) U.S. Cl.
   CPC .......... *G06F 12/0246* (2013.01); *G06F 3/0616* (2013.01); *G06F 3/0644* (2013.01); *G06F 3/0688* (2013.01); *G06F 2212/7206* (2013.01); *G06F 2212/7207* (2013.01); *G06F 2212/7208* (2013.01); *G06F 2212/7211* (2013.01)

(58) Field of Classification Search
   CPC ....................................................... G06F 12/00
   USPC .................. 711/103, 114, E12.002, E12.008; 714/718, 773; 365/171, 185.19, 365/185.28, 185.29
   See application file for complete search history.

(56) References Cited

U.S. PATENT DOCUMENTS

| | | | |
|---|---|---|---|
| 2009/0109786 A1* | 4/2009 | Ye et al. | 365/228 |
| 2009/0193184 A1* | 7/2009 | Yu et al. | 711/103 |
| 2011/0153908 A1* | 6/2011 | Schaefer et al. | 711/5 |
| 2012/0084504 A1* | 4/2012 | Colgrove et al. | 711/114 |
| 2012/0144090 A1* | 6/2012 | Song et al. | 711/102 |
| 2012/0144270 A1* | 6/2012 | Diggs et al. | 714/769 |
| 2012/0151130 A1* | 6/2012 | Merry et al. | 711/103 |
| 2012/0198129 A1* | 8/2012 | Van Aken et al. | 711/103 |
| 2012/0284587 A1* | 11/2012 | Yu et al. | 714/773 |

OTHER PUBLICATIONS

Shin et al, "FTL Design Exploration in Reconfigurable High-Performance SSD for Server Applications", ICS'09 Jun. 8-12, 2009, ACM 978-1-60558-498-0/09/06, pp. 338-349.*

* cited by examiner

*Primary Examiner* — Cheng-Yuan Tseng
*Assistant Examiner* — Kamal K Dewan
(74) *Attorney, Agent, or Firm* — Hall Estill Attorneys at Law

(57) ABSTRACT

Scalable control/management data structures enable optimizing performance and/or attempting to achieve a particular performance target of an SSD in accordance with host interfacing, number of NVM devices, NVM characteristics and size, and NVM aging and performance decline. Pre-scaled data structures are included in SSD controller firmware loadable at system initialization. Static data structure configurations enable load-once-operate-for-product-lifetime operation for consumer applications. Dynamic configurations provide sequences of data structures pre-scaled to optimize operation as NVM ages and performance declines. Pre-configured adjustments in data structure size included in consecutive configurations periodically replace earlier configurations at least one time during product lifetime, producing a periodic rescaling of data structure size to track changes in aging NVM. Optionally, sizes of some data structures are decreased as NVM usage increases, enabling an increase in translation layer mapping structure sizes, reducing accesses to translation tables in NVM, and reducing write amplification.

24 Claims, 8 Drawing Sheets

SCALABLE DATA STRUCTURES FOR CONTROL AND MANAGEMENT OF NON-VOLATILE STORAGE

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/316,373 filed 22 Mar. 2010, first named inventor Radoslav DANILAK, and entitled ACCESSING COMPRESSED DATA OF VARYING-SIZED QUANTA IN NON-VOLATILE MEMORY;

U.S. Non-Provisional Application Ser. No. 13/053,175 filed 21 Mar. 2011, first named inventor Radoslav DANILAK, and entitled ACCESSING COMPRESSED DATA OF VARYING-SIZED QUANTA IN NON-VOLATILE MEMORY; and U.S. Provisional Application Ser. No. 61/543,707 filed 5 Oct. 2011, first named inventor Earl T COHEN, and entitled SELF-JOURNALING AND HIERARCHICAL CONSISTENCY FOR NON-VOLATILE STORAGE.

BACKGROUND

1. Field

Advancements in storage device technology and manufacturing are needed to provide improvements in cost, profitability, performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

LIST OF REFERENCE SYMBOLS IN DRAWINGS

Figure 1A:
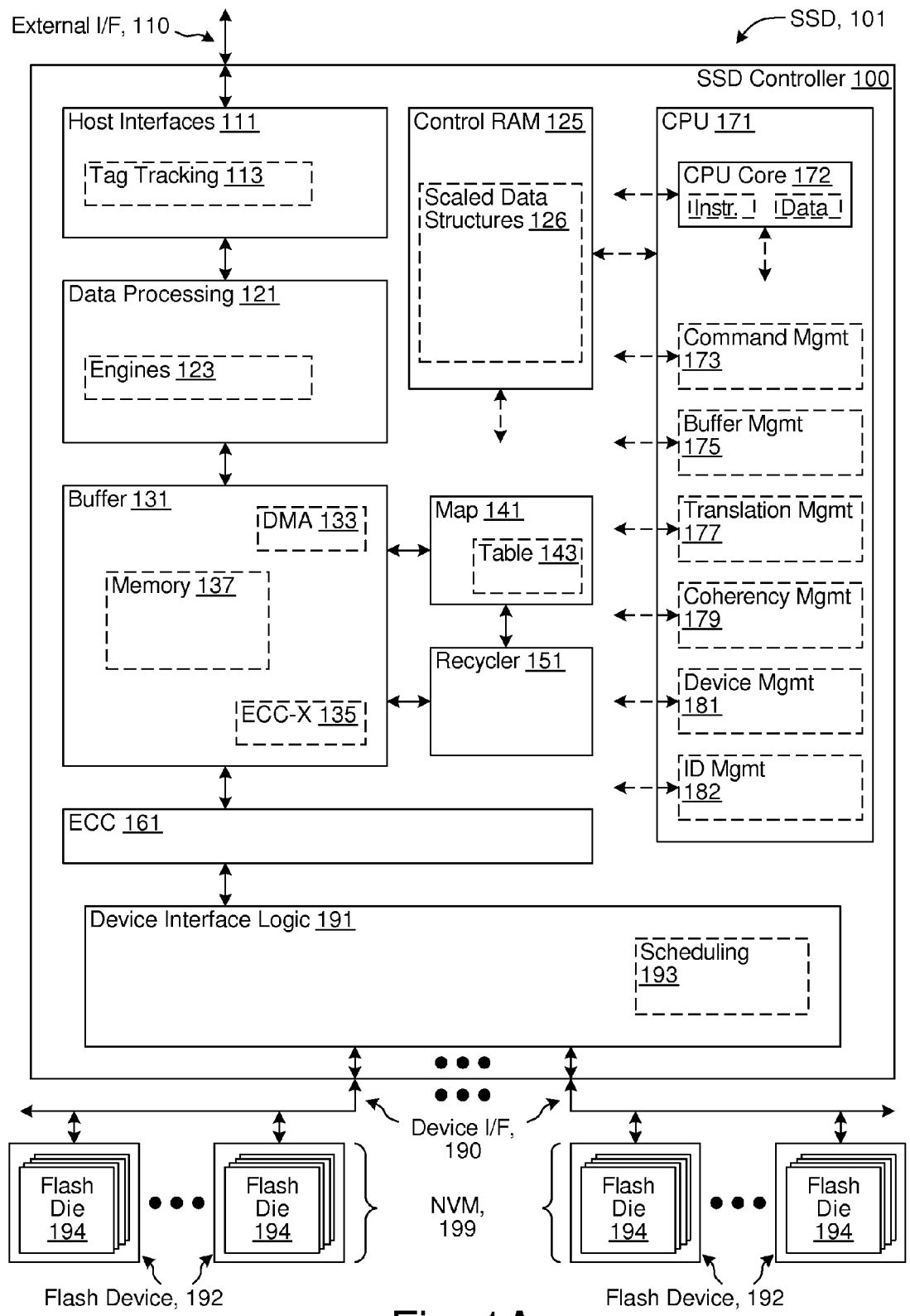
FIG. 1A illustrates selected details of an embodiment of a Solid-State Disk (SSD) including an SSD controller using scalable data structures for control and management of non-volatile storage, such as flash memories.

| Ref. Symbol | Element Name |
|---|---|
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |

| Ref. Symbol | Element Name |
| --- | --- |
| 118 | Servers |
| 119 | LAN/WAN |
| 121 | Data Processing |
| 123 | Engines |
| 125 | Control RAM |
| 126 | Scaled Data Structures |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 200 | Firmware installation, generally |
| 202 | Install OPER/Profile Firmware |
| 204 | (Optional) Modify OPER/Profile Firmware |
| 210 | Profiles of scaled data structures, generally |
| 212 | Static Profiles |
| 214 | Dynamic Profile Families |
| 218 | Static Profile SPA |
| 219 | Static Profile SPB |
| 220 | Static Profile SPJ |
| 221A-C | Dynamic Profiles DPA1-3 |
| 222A-D | Dynamic Profiles DPB1-4 |
| 223A-B | Dynamic Profiles DPK1-2 |
| 300 | Static profile activation, generally |
| 302 | Load OPER/Profile FW |
| 304 | Populate Data Structures |
| 306 | Operational Mode |
| 310 | Dynamic profile activation, generally |
| 312 | Load OPER/Profile FW |
| 314 | Select First Profile of Family |
| 316 | Populate Data Structures |
| 318 | Operational Mode |
| 320 | Gather NVM Performance Statistics |
| 322 | Rescale? test |
| 324 | Re-Select Current Profile |
| 326 | Select Next Profile |
| 400 | Static data structures, generally |
| 402 | (Optional) Device Interface Buffer |
| 404 | Static Data Structures |
| 406 | (Optional) Host Interface Buffer |
| 408A | First Level Map (FLM) |
| 408B | FLM Extension |
| 410 | Second Level Map Page Cache (SPC) |
| 412 | Read Disturb Count (RDC) |
| 414 | Block Error Statistics (BES) |
| 416 | Free Space Tracking (FST) |
| 417 | Reserved Space (RSV) |
| 418 | Scratch Space (SCRT) |
| 430 | Dynamic profiles, generally |
| 432 | Age of NVM |
| 434 | Specific profiles based on age/performance |
| 436A | Profile NEW |
| 436B | Profile NORM |
| 436C | Profile WORN |
| 438A-C | Power-ON trigger events ("P/O") |
| 440 | Power-ON non-trigger events ("non") |
| 446A-C | Dynamic Data Structures |
| 450A-C | First Level Map (FLM) |
| 451A-B | FLM extension |
| 452A-C | Second Level Map Page Cache (SPC) |
| 454A-C | Read Disturb Count (RDC) |
| 456A-C | Block Error Statistics (BES) |
| 458A | Weak ECC |
| 458B | Moderate ECC |
| 458C | Strong ECC |
| 499A-C | Reserved Space (RSV) |
| 500 | Address Mapping, generally |
| 511 | LBA |
| 513 | LPN |
| 515 | Logical Offset |
| 521 | Map Info for LPN |
| 523 | Read Unit Address |
| 525 | Length in Read Units |
| 600 | NVM Read Accessing, generally |
| 611 | Read Data |
| 613 | First Read Unit |
| 615 | Last Read Unit |
| 700 | LBA to NVM Location Mapping, generally |
| 710 | FLM |
| 710.1 | SLM Page/Length |
| 710.2 | SLM Page/Length |
| 710.M | SLM Page/Length |
| 710S | SLM Pointer |
| 720 | SLM Page |
| 720.1 | LB Page/Length |
| 720.2 | LB Page/Length |
| 720.N | LB Page/Length |
| 720L | LB Pointer |
| 721 | LBA |
| 722 | Integer Divider |
| 722Q | FLM Index |
| 722R | SLM Page Index |
| 723 | SLM Entries/SLM Page (CSR) |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| ASCII | American Standard Code for Information Interchange |
| ATA | Advanced Technology Attachment (AT Attachment) |
| BCH | Bose Chaudhuri Hocquenghem |
| BES | Block Error Statistics |
| BIOS | Basic Input/Output System |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DES | Data Encryption Standard |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| EPROM | Erasable Programmable Read Only Memory |
| eSATA | external Serial Advanced Technology Attachment |
| FLM | First Level Map |
| FST | Free Space Tracking |
| FW | Firmware |
| GPS | Global Positioning System |
| HBA | Host Bus Adapter |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LB | Logical Block |
| LBA | Logical Block Address |
| LDPC | Low-Density Parity-Check |
| LPN | Logical Page Number |
| MAC | Media Access Control |
| MLC | Multi-Level Cell |
| MMC | MultiMediaCard |
| MPEG | Moving Picture Experts Group |
| MRAM | Magnetic Random Access Memory |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| POS | Point of Sale |
| RAID | Redundant Array of Inexpensive/Independent Disks |
| RAM | Random Access Memory |
| RASIE | Redundant Array of Silicon Independent Elements |
| RDC | Read Disturb Count |
| ReRAM | Resistive Random Access Memory |
| ROM | Read Only Memory |
| RS | Reed-Solomon |
| RSA | Rivest, Shamir & Adleman |
| RSV | Reserved Space |
| SAN | Storage Attached Network |
| SAS | Serial Attached Small Computer System Interface (Serial SCSI) |
| SATA | Serial Advanced Technology Attachment (Serial ATA) |
| SCRT | Scratch Space |
| SCSI | Small Computer System Interface |
| SD | Secure Digital |
| SDR | Single-Data-Rate |
| SLC | Single-Level Cell |
| SLM | Second-Level Map |
| SMART | Self-Monitoring Analysis and Reporting Technology |
| SPC | Second-level map Page Cache |
| SRAM | Static Random Access Memory |
| SSD | Solid-State Disk/Drive |
| UFS | Unified Flash Storage |
| USB | Universal Serial Bus |
| VF | Virtual Function |
| WAN | Wide Area Network |

Scalable control and/or management data structures enable optimizing performance and/or achieving a particular performance target of an SSD to match requirements of host interfacing, number of NVM devices, NVM characteristics and size, and NVM aging and performance decline. Pre-scaled data structures are included in SSD controller firmware loadable at system initialization. Static data structure configurations enable load-once-operate-for-product-lifetime operation for consumer applications. Dynamic configurations provide sequences of data structures pre-scaled to optimize operation as NVM ages and performance declines. Pre-configured adjustments in data structure size included in consecutive configurations periodically replace earlier configurations at least one time during product lifetime, thus producing periodic rescaling of data structure size to track changes in aging NVM. Optionally, sizes of some data structures are decreased as NVM usage increases, enabling an increase in size of translation layer mapping structures, thus reducing accesses to translation tables in NVM, and therefore reducing write amplification.

In various embodiments, an SSD has a fixed amount of memory available for all or any portions of data structures used to control and/or manage NVM providing storage for the SSD. Some SSDs use fixed, on-chip memories for data structures (such as one or more memory arrays included on a die implementing, e.g. a controller of the SSD). Some SSDs use off-chip memories (such as one or more DRAM devices coupled to the controller). Some SSDs user a combination of one or more on-chip memories and one or more off-chip memories. Examples of the data structures include:

1. A map (and/or a cached portion thereof), for converting from Host LBAs to addresses of the NVM. According to various embodiments, the map includes one or more levels of translation. For example, the map includes a first-level map stored in a data structure, and a second-level map stored in the NVM, with a cached portion of the second-level map stored in a data structure.
2. A Read Disturb Count (RDC) data structure, for tracking a number of reads for all or any portions of the NVM.
3. A Block (or alternatively region) Error Statistics (BES) data structure, for tracking error rates observed for all or any portions of the NVM.

4. Free-space tracking, such as based on all or any, e.g., managed regions of the NVM.
5. NVM management data, such as a code rate, capacity, and/or status of all or any portions of the NVM.
6. Host read and/or write data.
7. NVM write data (in host/user and/or NVM formats).
8. NVM read data (in host/user and/or NVM formats).
9. Various data structures used to manage host traffic.
10. Scratch space for firmware task reference, such as DMA descriptors, scatter/gather lists, debug logs, and storage for temporary elements.

With respect to the foregoing examples of data structures, the portions and/or regions include, e.g., one or more blocks, one or more blocks managed as a group of managed blocks, one or more R-blocks (described elsewhere herein), one or more blocks physically co-located in a die of the NVM, and one or more blocks having and/or exhibiting similar characteristics with respect to a particular data structure (e.g. a collection of blocks exhibiting similar block error behavior, or a group of blocks having similar read disturb characteristics). In various embodiments, any one or more of the data structures have information that is based on one or more statistical samples of a particular item, rather than all instances of the particular item. For example, a BES data structure includes a statistical sampling of block error behavior for a subset of blocks, rather than block error behavior for all blocks, thus reducing storage used by the BES data structure. In various embodiments, any one or more of the data structures are according to a saturating counter technique. For example, a BES data structure limits a range of an entry of the data structure from, e.g., zero to a saturated value.

In some contexts, an amount of the NVM that a particular entry in a particular one of the data structures corresponds to is an example of a granularity of the particular entry. Thus as granularity increases, a number of entries to cover a same amount of the NVM decreases (and vice-versa). For instance, an RDC data structure that tracks on a block basis is referred to as having a block granularity. For another instance, an RDC data structure that tracks on a page basis is referred to as having a page granularity. Tracking a same amount of NVM, fewer block-granular RDC data structure entries are used compared to page-granular RDC data structure entries (since blocks are larger than pages).

In some embodiments, all entries of a particular data structure have a same granularity. E.g. consider a scenario of a BES data structure with every entry tracking a single block. Thus all of the entries have a granularity of a single block. In some embodiments, various entries of a particular data structure have varying granularities. E.g. consider a scenario of an RDC data structure with two sections of entries, one of the sections for a segment of the NVM used as SLC storage and another of the sections for a segment of the NVM used as MLC storage. The section for the SLC storage has an entry for every block of the SLC storage section, and the section for the MLC storage has an entry for every page of the MLC storage section. Thus the SLC section entries have a granularity of a block and the MLC section entries have a granularity of a page.

In various embodiments, granularity of entries of one or more of the data structures is traded-off against storage used. For example, various respective embodiments use various respective granularities for various respective data structures, and thus various respective amounts of storage are used for the various respective data structures (assuming other properties of the various embodiments are identical, such as amount of NVM tracked by the various respective data structures). E.g., two respective embodiments use two respective granularities for respective RDC data structures, and thus two respective amounts of storage are used for the respective RDC data structures (assuming other properties of the two embodiments are identical, such as amount of NVM tracked by the respective RDC data structures). For another example, a same embodiment uses various respective granularities for a same data structure at various respective times. E.g., initially a relatively smaller granularity RDC data structure followed later in time by a relatively larger granularity RDC data structure.

In some contexts, a unit of measure (or alternatively a fineness of representation) that a particular entry in a particular one of the data structures corresponds to is an example of a resolution of the particular entry. For instance, an FST data structure that tracks free space in bytes has a resolution of a single byte. For other instances, various FST data structures that respectively track free space in pages, blocks, and R-blocks have respective resolutions of a single page, a single block, and a single R-block. In some embodiments, all entries of a particular data structure have a same granularity. In some embodiments, various entries of a particular data structure have varying resolutions.

In various embodiments, resolution of information in one or more of the data structures is traded-off against storage used. For example, various respective embodiments use various respective resolutions for various respective data structures, and thus various respective amounts of storage are used for the respective data structures (assuming other properties of the various embodiments are identical, such as amount of NVM tracked by the various respective data structures). E.g., two respective embodiments use two respective resolutions for respective FST data structures, and thus two respective amounts of storage are used for the respective FST data structures (assuming other properties of the two embodiments are identical, such as amount of NVM tracked by the respective FST data structures). For another example, a same embodiment uses various respective resolutions for a same data structure at various respective times. E.g., initially a relatively larger resolution FST data structure followed later in time by a relatively smaller resolution FST data structure.

Some SSDs use an external memory, such as a DRAM, to store a portion of some data structures, such as a map. The external memory enables an entire copy of the map to be stored in quickly-accessible (but volatile) memory. In some embodiments and/or usage scenarios, using a DRAM, however, increases one or more of cost, power, and area.

In some embodiments, an SSD includes one or more buffer memories, such as implemented in an integrated circuit including a controller for the SSD. For example, with respect to a layout of circuitry of the integrated circuit, a first buffer memory is located physically closer to NVM interface logic and/or pins, and is preferentially used to store NVM read and/or write data. Continuing the example, a second buffer memory is more centrally located and is preferentially used to store NVM management data, such as a portion of a map. In further embodiments, a third buffer memory is located near a host interface and is used to buffer and/or store host-related management information and/or some or all host data traffic.

In various embodiments, data structures are allocated to static locations and/or sizes in one or more of the buffer memories when the SSD is initialized, such as by being powered on and/or reset. In some embodiments and/or usage scenarios, using static allocation reduces a memory footprint and/or a CPU performance overhead compared to dynamic allocation. In some embodiments, static allocation enables all data structures to fit in the buffer memories in all scenarios. For example, in all ordering-based scenarios, there is always a respective region large enough for each of the data structures, thus eliminating re-shuffling of locations of the data structures in the buffer memories.

In various embodiments, static allocation implies that all data structures are present all of the time. In various embodiments, static allocation implies that space is reserved for all data structures all of the time, but some data structures do not use all their allocated space all of the time. For example, space is reserved for a maximum number of entries in a second-level map page cache, and the cache is not fully populated all of the time.

In some embodiments, static allocation implies that all data structures have a fixed size in all configurations using a same firmware image. However, in other static allocation embodiments, one or more data structures have a size that is based at least in part on a configuration and/or an operating context of an SSD. For example, firmware code operable at one or more of drive manufacturing, drive formatting, drive power-on, and drive reset is enabled to determine a size and/or a location of each of the statically allocated data structures. The size of each of the statically allocated data structures varies according to one or more of: a size of one or more buffer memories; a size of NVM of the SSD; a type of the NVM; parameters of the NVM, such as page size and/or block size; system configuration parameters stored in the NVM; configuration information downloaded from a host; performance targets; power targets; and other similar factors. In some embodiments, the NVM type and/or parameters are available by reading a parameter page and/or internal registers of the NVM. According to various embodiments, at least some of the system configuration parameters are one or more of: stored in the NVM when the SSD is manufactured; retrievable and/or changeable via a configuration program operating via a host interface and communicating with the firmware image.

In some embodiments, a size of a first-level map structure and/or a second-level map page cache structure are varied according to an available amount of buffer storage provided by one or more buffer memories after allocating others of a plurality of data structures. In further embodiments, the number of entries per second-level map page is determined such that the data structures fully utilize the buffer memories, and the number of entries per second-level map pages is not a power-of-two. (A final entry in the first-level map optionally indicates a second-level map page having a smaller number of entries than others of the second-level map pages.) In some usage scenarios, maximizing a number of first-level map entries advantageously reduces a number of entries per second-level map page and reduces write amplification due to map updates.

In various embodiments and/or usage scenarios, a static "configuration based" scaling based at least in part on SSD capacity has particular advantages. In various embodiments and/or usage scenarios, as SSD capacity decreases (e.g. there are fewer flash die), a number of SLM entries is correspondingly decreased (keeping a logical page size constant). In some embodiments, as SSD capacity decreases, a logical page size is correspondingly decreased (keeping a number of SLM entries constant). In various embodiments and/or usage scenarios, as SSD capacity decreases, a number of SLM entries is decreased and a logical page size is decreased, with the decreases in the number of SLM entries and logical page size in combination corresponding to the decrease in the SSD capacity.

In various embodiments with the number of SLM entries correspondingly decreased, if the FLM has a same number of entries before and after the decrease, then there are fewer SLM entries per SLM page after the decrease. Therefore, the SPC (SLM Page Cache) is smaller for a constant number of SLM Pages being cached (since there are fewer SLM entries per SLM page), enabling an increase in the number of FLM entries. In various embodiments, a reduced SSD capacity enables a corresponding reduction in sizes of block-based and/or die-based data structures, enabling corresponding increases in the number of FLM entries and/or the number of SLM entries per SLM page. In various embodiments, a reduced SSD capacity enables improved performance via a reduction in an amount of read-modify-write activity, such as when an amount of data mapped by an FLM and/or SLM entry is smaller after the reduction than before.

Some techniques of the static configuration based scaling embodiments are applicable to a one-level map divided into "regions," as well as to the two-level map described above, and are performable by firmware, by hardware, or by any combination thereof. In some embodiments, a two-level map using an integer divider provides finer granularity (and/or control thereof) of SLM pages, such as by enabling smaller SLM pages.

According to various embodiments, the map is one or more of: a one-level map; a two-level map; a multi-level map; a direct map; an associative map; and any other mechanism for associating LBAs of a host protocol with physical storage addresses in NVM. For example, in some embodiments, a two-level map includes a first-level map that associates a first function of an LBA with a respective address in the NVM of one of a plurality of second-level map pages, and each of the second-level map pages associates a second function of the LBA with a respective address in the NVM of data corresponding to the LBA. In further embodiments, an example of the first function of the LBA and the second function of the LBA are a quotient and a remainder obtained when dividing by a fixed or alternatively programmable number of entries included in each of the second-level map pages. The plurality of second-level map pages is collectively termed a second-level map. Herein, references to one or more entries of a map refers to one or more entries of any type of map, including a one-level map, a first-level of a two-level map, a second-level of a two-level map, any level of a multi-level map, or any other type of map having entries.

According to various embodiments, each of the map pages of a second-level map (or a lower-level of a multi-level map) one or more of: includes a same number of entries as others of the map pages; includes a different number of entries than at least some others of the map pages; includes entries of a same granularity as others of the map pages; includes entries of a different granularity than others of the map pages; includes entries that are all of a same granularity; includes entries that are of multiple granularities; includes a respective header specifying a format and/or layout of contents of the map page; and has any other format, layout, or organization to represent entries of the map page. For example, a first second-level map page has a specification of a granularity of 4 KB per entry, and a second second-level map page has a specification of a granularity of 8 KB per entry and only one half as many entries as the first second-level map page.

In further embodiments, entries of a higher-level map include format and/or layout information of corresponding lower-level map pages. For example, each of the entries in a first-level map includes a granularity specification for entries in the associated second-level map page.

In some embodiments, the map includes a plurality of entries, each of the entries associating one or more LBAs with information selectively including a respective location in the NVM where data of the LBAs is stored. For example, LBAs specify 512B sectors, and each entry in the map is associated with an aligned eight-sector (4 KB) region of the LBAs.

According to various embodiments, the information of the entries of the map includes one or more of: a location in the NVM; an address of a read unit in the NVM; a number of read units to read to obtain data of associated LBAs stored in the NVM; a size of the data of the associated LBAs stored in the NVM, the size having a granularity that is optionally and/or selectively larger than one byte; an indication that the data of the associated LBAs is not present in the NVM, such as due to the data of the associated LBAs being trimmed; a property of the data of the associated LBAs; and any other meta-data, property, or nature of the data of the associated LBAs.

In some embodiments, addresses in the NVM are grouped into regions to reduce a number of bits required to represent one of the addresses. For example, if LBAs of the I/O device are divided into 64 regions, and the NVM is divided into 64 regions, one for each of the LBA regions, then a map entry associated with a particular LBA requires six fewer address bits since one of the regions in the NVM is able to be determined by the region of the particular LBA. According to various embodiments, an association between regions of the LBAs and regions of the NVM is by one or more of: equality; a direct association, such as 1-to-1 numeric function; a table look-up; a dynamic mapping; and any other technique for associating two sets of numbers.

In various embodiments, the location in the NVM includes an address of one of a plurality of read units, and a length and/or a span in read units. The length is a size of a particular one of a plurality of data items stored in the NVM, the particular data item associated with the entry of the map including the length. According to various embodiments, the length has a granularity of one or more of: one byte; more than one byte; one read unit; a specified fraction of a read unit; a granularity according to a maximum allowed compression rate of one of the data items; and any other granularity used to track storage usage. The span is a number of reads units, such as an integer number of read units, storing a respective portion of the particular data item. In further embodiments and/or usage scenarios, a first read unit in the span of read units and/or a last read unit in the span of read units optionally and/or selectively store some or all of multiple ones of the data items. In some embodiments and/or usage scenarios, the length and/or the span are stored encoded, such as by storing the length (sometimes termed size in a context with length and/or span encoded) as an offset from the span. In some embodiments and/or usage scenarios, unused encodings of the length and/or the span encode additional information, such as an indication as to whether an associated data item is present in the NVM.

Encoding the location in the NVM as an address and a length enables data stored in the NVM to vary in size. For example, a first 4 KB region is compressed to 400 B in size, is stored entirely in a single read unit (e.g. has a span of one read unit), and has a length of one read unit, whereas a second 4 KB region is incompressible, is stored entirely within more than one read unit (e.g. has a span of more than one read unit), and has a length of more than one read unit. For another example, a third 2 KB region is compressed to 1 KB in size, is stored spanning two read units (e.g. has a span of two read units), and has a length of one read unit, whereas a fourth 1 KB region is incompressible, but is stored within one read unit (e.g. has a span of one read unit), and has a length of one read unit. In further embodiments, having a length and/or span in read units of storage associated with a region of the LBAs enables reading solely a required portion of the NVM to retrieve data of the region of the LBAs.

In some embodiments, each of the entries of the map includes information, sometimes termed meta-data, specifying properties of a region of the LBAs associated with the entry. In further embodiments, at least some of the meta-data is of a granularity finer than that of the region, such as by having separate meta-data specifications for each of a plurality of LBAs of the region.

In various embodiments, various NVM management functions (e.g. reading, recycling, erasing, and/or programming/writing) are performed in units of R-blocks. An R-block is exemplified as a logical slice or section across various die (e.g. all die, all die excluding ones that are wholly or partially failed, and/or one or more selected subsets of die) of, e.g., a flash memory. For example, in a flash memory having R flash die, each flash die having N blocks, each R-block is the $i^{th}$ block from each of the flash die taken together, for a total of N R-blocks. Continuing with the example, if one of the R flash die fails, then each R-block is the $i^{th}$ block from each of the flash die except the failed flash die, for a total of N−1 R-blocks. For another example, in a flash memory having R flash die, each with N blocks, each R-block is the $i^{th}$ and $(i+1)^{th}$ block from each of the flash die, for a total of N/2 R-blocks. For yet another example, in a flash memory having a plurality of dual plane devices, each R-block is the $i^{th}$ even block and the $i^{th}$ odd block from each of the dual plane devices. For a final example, in a flash memory having R flash die, each with N blocks, each R-block is the $i^{th}$ through $(i+k-1)^{th}$ block from each of the flash die, for a total of N/k R-blocks.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A system, comprising:
one or more Non-Volatile Memories (NVMs);
a Solid-State Disk (SSD) controller enabled to communicate with the NVMs, the SSD controller comprising one or more buffer memories and means for populating enabled to populate the buffer memories with one or more data structures comprising management information usable by the SSD controller;
wherein the SSD controller further comprises means for scaling at least one of the data structures based at least in part on one or more characteristics of the NVMs; and
wherein the characteristics comprise age information of the NVMs.

EC2) The system of EC1, wherein the data structures comprise map information to enable conversion of address information received from a host to physical address information to provide to the NVMs, and at least a portion of the map information is allocated to the buffer memories after and in accordance with allocation of at least one other item to the buffer memories.

EC3) The system of EC1, wherein the data structures comprise any one or more of
map information to enable conversion of address information received from a host to physical address information to provide to the NVMs;

read disturb count information to enable tracking a number of reads to one or more blocks of the NVMs;
block error statics to enable tracking error rates of one or more of the blocks;
free space information;
management information relating to code rate, capacity, and/or status of one or more regions of the NVMs;
one or more read and/or write buffers associated with exchanging information with the host;
one or more traffic management data structures associated with managing traffic with the host;
one or more read and/or write buffers associated with exchanging information with the NVMs;
one or more traffic management data structures associated with managing traffic with the NVMs; and
one or more scratch spaces used by the means for populating when executing firmware.

EC4) The system of EC3, wherein the map information is in accordance with a multi-level map.

EC5) The system of EC4, wherein the multi-level map is a two-level map.

EC6) The system of EC4, wherein
the multi-level map comprises a first-level map and a second-level map;
the map information comprises at least a portion of the first-level map;
the map information comprises at least a portion of a cached portion of the second-level map; and
at least a portion of the NVMs stores at least a portion of the second-level map.

EC7) The system of EC1, wherein
the SSD controller further comprises
NVM interfacing means for interfacing to the NVMs, and
host interfacing means for interfacing to a host;
the buffer memories comprise an NVM buffer memory preferentially used to buffer exchanges with the NVMs and a host buffer memory preferentially used to buffer exchanges with the host;
the SSD controller is implemented in a single integrated circuit; and
with respect to physical topology of the single integrated circuit, the NVM buffer memory is located closer to the NVM interfacing means than the host interfacing means is, and the host buffer memory is located closer to the host interfacing means than the NVM interfacing means is.

EC8) The system of EC1, wherein the characteristics further comprise amount of storage provided by the NVMs.

EC9) The system of EC1, wherein the means for scaling is further based at least in part on a number of devices the NVMs comprise.

EC10) The system of EC1, wherein the means for scaling is enabled to allocate static locations in the buffer memories to the data structures selectively in response to an event.

EC11) The system of EC10, wherein the event is any one or more of a power-on event, a reset event, and an initialization event.

EC12) The system of EC10, wherein a size of at least one of the data structures varies in accordance with any one or more of:
storage capacity of the buffer memories;
storage capacity of the NVMs;
number of the NVMs;
number of die of the NVMs;
number of devices the NVMs comprise;
types of each of the NVMs;
parameters of each of the NVMs;
configuration parameters stored in the NVMs;
configuration information downloaded from a host;
performance targets; and
power targets.

EC13) The system of EC12, wherein the configuration parameters are any one or more of:
stored in the NVMs when the system is manufactured; and
stored in the NVMs when firmware executable by the means for populating is modified.

EC14) A method, comprising:
via a Solid-State Disk (SSD) controller, communicating with one or more Non-Volatile Memories (NVMs) and populating one or more buffer memories of the SSD controller with one or more data structures comprising management information usable by the SSD controller;
further via the SSD controller, scaling at least one of the data structures based at least in part on one or more characteristics of the NVMs; and
wherein the characteristics comprise age information of the NVMs.

EC15) The method of EC14, wherein the data structures comprise map information to enable conversion of address information received from a host to physical address information to provide to the NVMs, and at least a portion of the map information is allocated to the buffer memories after and in accordance with allocation of at least one other item to the buffer memories.

EC16) The method of EC14, wherein the data structures comprise any one or more of
map information to enable conversion of address information received from a host to physical address information to provide to the NVMs;
read disturb count information to enable tracking a number of reads to one or more blocks of the NVMs;
block error statics to enable tracking error rates of one or more of the blocks;
free space information;
management information relating to code rate, capacity, and/or status of one or more regions of the NVMs;
one or more read and/or write buffers associated with exchanging information with the host;
one or more traffic management data structures associated with managing traffic with the host;
one or more read and/or write buffers associated with exchanging information with the NVMs;
one or more traffic management data structures associated with managing traffic with the NVMs; and
one or more scratch spaces used by the populating when executing firmware.

EC17) The method of EC16, wherein the map information is in accordance with a multi-level map.

EC18) The method of EC17, wherein the multi-level map is a two-level map.

EC19) The method of EC17, wherein
the multi-level map comprises a first-level map and a second-level map;
the map information comprises at least a portion of the first-level map;
the map information comprises at least a portion of a cached portion of the second-level map; and
at least a portion of the NVMs stores at least a portion of the second-level map.

EC20) The method of EC14, wherein
the SSD controller comprises
an NVM interface enabled to interface to the NVMs, and
a host interface enabled to interface to a host;

the buffer memories comprise an NVM buffer memory preferentially used to buffer exchanges with the NVMs and a host buffer memory preferentially used to buffer exchanges with the host;

the SSD controller is implemented in a single integrated circuit; and with respect to physical topology of the single integrated circuit, the NVM buffer memory is located closer to the NVM interface than the host interface is, and the host buffer memory is located closer to the host interface than the NVM interface is.

EC21) The method of EC14, wherein the characteristics further comprise amount of storage provided by the NVMs.

EC22) The method of EC14, wherein the scaling is further based at least in part on a number of devices the NVMs comprise.

EC23) The method of EC14, wherein the scaling allocates static locations in the buffer memories to the data structures selectively in response to an event.

EC24) The method of EC23, wherein the event is any one or more of a power-on event, a reset event, and an initialization event.

EC25) The method of EC23, wherein a size of at least one of the data structures varies in accordance with any one or more of:
storage capacity of the buffer memories;
storage capacity of the NVMs;
number of the NVMs;
number of die of the NVMs;
number of devices the NVMs comprise;
types of each of the NVMs;
parameters of each of the NVMs;
configuration parameters stored in the NVMs;
configuration information downloaded from a host;
performance targets; and
power targets.

EC26) The method of EC25, wherein the configuration parameters are any one or more of:
stored in the NVMs during manufacturing; and
stored in the NVMs when firmware executed in conjunction with the populating is modified.

EC27) An apparatus, comprising:
one or more Non-Volatile Memories (NVMs);
a Solid-State Disk (SSD) controller enabled to communicate with the NVMs, the SSD controller comprising one or more buffer memories and hardware logic circuitry enabled to populate the buffer memories with one or more data structures comprising management information usable by the SSD controller;
wherein the hardware logic circuitry is further enabled to scale at least one of the data structures based at least in part on one or more characteristics of the NVMs; and
wherein the characteristics comprise age information of the NVMs.

EC28) The apparatus of EC27, wherein the data structures comprise map information to enable conversion of address information received from a host to physical address information to provide to the NVMs, and at least a portion of the map information is allocated to the buffer memories after and in accordance with allocation of at least one other item to the buffer memories.

EC29) The apparatus of EC27, wherein the data structures comprise any one or more of
map information to enable conversion of address information received from a host to physical address information to provide to the NVMs;
read disturb count information to enable tracking a number of reads to one or more blocks of the NVMs;
block error statics to enable tracking error rates of one or more of the blocks;
free space information;
management information relating to code rate, capacity, and/or status of one or more regions of the NVMs;
one or more read and/or write buffers associated with exchanging information with the host;
one or more traffic management data structures associated with managing traffic with the host;
one or more read and/or write buffers associated with exchanging information with the NVMs; and
one or more traffic management data structures associated with managing traffic with the NVMs.

EC30) The apparatus of EC27, wherein a size of at least one of the data structures varies in accordance with any one or more of:
storage capacity of the buffer memories;
storage capacity of the NVMs;
number of the NVMs;
number of die of the NVMs;
number of devices the NVMs comprise;
types of each of the NVMs;
parameters of each of the NVMs;
configuration parameters stored in the NVMs;
configuration information downloaded from a host;
performance targets; and
power targets.

EC31) A tangible computer readable medium having a set of instructions stored therein that when executed by a processing element cause the processing element to perform and/or control operations comprising:
populating one or more buffer memories of a Solid-State Disk (SSD) controller with one or more data structures comprising management information usable by the SSD controller, the SSD controller enabled to communicate with one or more Non-Volatile Memories (NVMs);
scaling at least one of the data structures based at least in part on one or more characteristics of the NVMs;
wherein the processing element is comprised in the SSD controller; and
wherein the characteristics comprise age information of the NVMs.

EC32) The tangible computer readable medium of EC31, wherein the data structures comprise map information to enable conversion of address information received from a host to physical address information to provide to the NVMs, and at least a portion of the map information is allocated to the buffer memories after and in accordance with allocation of at least one other item to the buffer memories.

EC33) The tangible computer readable medium of EC31, wherein the data structures comprise any one or more of
map information to enable conversion of address information received from a host to physical address information to provide to the NVMs;
read disturb count information to enable tracking a number of reads to one or more blocks of the NVMs;
block error statics to enable tracking error rates of one or more of the blocks;
free space information;
management information relating to code rate, capacity, and/or status of one or more regions of the NVMs;
one or more read and/or write buffers associated with exchanging information with the host;
one or more traffic management data structures associated with managing traffic with the host;

one or more read and/or write buffers associated with exchanging information with the NVMs;

one or more traffic management data structures associated with managing traffic with the NVMs; and one or more scratch spaces used by the populating when executing firmware.

EC34) The tangible computer readable medium of EC31, wherein a size of at least one of the data structures varies in accordance with any one or more of:

storage capacity of the buffer memories;
storage capacity of the NVMs;
number of the NVMs;
number of die of the NVMs;
number of devices the NVMs comprise;
types of each of the NVMs;
parameters of each of the NVMs;
configuration parameters stored in the NVMs;
configuration information downloaded from a host;
performance targets; and
power targets.

EC35) A system, comprising:
one or more Non-Volatile Memories (NVMs);
a Solid-State Disk (SSD) controller enabled to communicate with the NVMs and comprising
one or more buffer memories,
means for populating enabled to populate the buffer memories with one or more data structures in accordance with mapping information usable by the SSD controller to map storage addresses of a host to physical addresses of the NVMs, and
means for dividing enabled to determine locations in the data structures based at least in part on the host storage addresses and a programmable parameter, the means for dividing operable to divide in accordance with a divisor specified at least in part by the programmable parameter;
wherein the SSD controller is operable to provide respective first and second storage capacities when operating in respective first and second storage modes, the first storage capacity being greater than the second storage capacity; and
wherein the SSD controller is further operable to set the programmable parameter to respective first and second values when operating respectively in the first and the second storage modes, the first value being greater than the second value.

EC36) The system of EC35, wherein the first and the second storage capacities correspond to respective storage subsystem storage capacities made available to respective first and second hosts.

EC37) The system of EC35, wherein a smaller of the first and the second storage capacities provides a higher performance relative to the larger storage capacity.

EC38) A method, comprising:
via a Solid-State Disk (SSD) controller, communicating with one or more Non-Volatile Memories (NVMs), the SSD controller comprising one or more buffer memories;
populating the buffer memories with one or more data structures in accordance with mapping information usable by the SSD controller to map storage addresses of a host to physical addresses of the NVMs;
arithmetically dividing to determine locations in the data structures based at least in part on the host storage addresses and a programmable parameter, the arithmetically dividing being in accordance with a divisor specified at least in part by the programmable parameter;
operating the SSD controller to provide respective first and second storage capacities while in respective first and second storage modes, the first storage capacity being greater than the second storage capacity; and
further operating the SSD controller to set the programmable parameter to respective first and second values while respectively in the first and the second storage modes, the first value being greater than the second value.

EC39) The method of EC38, wherein the first and the second storage capacities correspond to respective storage subsystem storage capacities made available to respective first and second hosts.

EC40) The method of EC38, wherein a smaller of the first and the second storage capacities provides a higher performance relative to the larger storage capacity.

EC41) An apparatus, comprising:
one or more Non-Volatile Memories (NVMs);
a Solid-State Disk (SSD) controller enabled to communicate with the NVMs and comprising
one or more buffer memories,
hardware logic circuitry enabled to populate the buffer memories with one or more data structures in accordance with mapping information usable by the SSD controller to map storage addresses of a host to physical addresses of the NVMs, and
a hardware logic arithmetic divider enabled to determine locations in the data structures based at least in part on the host storage addresses and a programmable parameter, the hardware logic arithmetic divider operable to divide in accordance with a divisor specified at least in part by the programmable parameter;
wherein the SSD controller is operable to provide respective first and second storage capacities when operating in respective first and second storage modes, the first storage capacity being greater than the second storage capacity; and
wherein the SSD controller is further operable to set the programmable parameter to respective first and second values when operating respectively in the first and the second storage modes, the first value being greater than the second value.

EC42) The apparatus of EC41, wherein the first and the second storage capacities correspond to respective storage subsystem storage capacities made available to respective first and second hosts.

EC43) The apparatus of EC41, wherein a smaller of the first and the second storage capacities provides a higher performance relative to the larger storage capacity.

EC44) A tangible computer readable medium having a set of instructions stored therein that when executed by a processing element cause the processing element to perform and/or control operations comprising:
populating one or more buffer memories of a Solid-State Disk (SSD) controller in accordance with mapping information usable by the SSD controller to map storage addresses of a host to physical addresses of one or more Non-Volatile Memories (NVMs) the SSD controller is enabled to communicate with;
arithmetically dividing to determine locations in the data structures based at least in part on the host storage addresses and a programmable parameter, the arithmetically dividing being in accordance with a divisor specified at least in part by the programmable parameter;
operating the SSD controller to provide respective first and second storage capacities while in respective first and second storage modes, the first storage capacity being greater than the second storage capacity; and further operating the SSD controller to set the programmable parameter to respective first and second values while respectively in the first and the second storage modes, the first value being greater than the second value.

EC45) The tangible computer readable medium of EC44, wherein the first and the second storage capacities correspond to respective storage subsystem storage capacities made available to respective first and second hosts.

EC46) The tangible computer readable medium of EC44, wherein a smaller of the first and the second storage capacities provides a higher performance relative to the larger storage capacity.

EC47) A method, comprising:

accessing data structures for management and control of a Solid-State Disk (SSD);

periodically rescaling the data structures to optimize performance of the SSD based on an age and/or a performance of Non-Volatile Memory (NVM) of the SSD;

wherein the accessing and the periodically rescaling are at least in part via a controller of the SSD; and wherein the periodically rescaling results in rescaling at least once during a lifetime of the NVM.

EC48) The method of EC47, wherein the at least one rescaling occurs in response to any one of:

initialization of the SSD;

reset of the SSD; and power-ON of the SSD.

EC49) The method of EC48, wherein the periodically rescaling is conditional based at least in part on the age and/or the performance of the NVM.

EC50) The method of EC49, further comprising maintaining performance statistics of the NVM, and wherein the periodically rescaling is further conditional based at least in part on the performance statistics.

EC51) An apparatus, comprising:

one or more buffer memories;

hardware logic circuitry enabled to access data structures comprised in the buffer memories, the data structures relating to management and control of a Solid-State Disk (SSD);

wherein the hardware logic circuitry is further enabled to periodically rescale the data structures to optimize performance of the SSD based on an age and/or a performance of Non-Volatile Memory (NVM) of the SSD; and wherein the periodically rescaling results in rescaling at least once during a lifetime of the NVM.

EC52) The apparatus of EC51, wherein the at least one rescaling occurs in response to any one of:

initialization of the SSD;

reset of the SSD; and power-ON of the SSD.

EC53) The apparatus of EC52, wherein the periodically rescaling is conditional based at least in part on the age and/or the performance of the NVM.

EC54) The apparatus of EC53, wherein the periodically rescaling is further conditional based at least in part on performance statistics maintained relating to the NVM.

EC55) A tangible computer readable medium having a set of instructions stored therein that when executed by a processing element cause the processing element to perform and/or control operations comprising:

accessing data structures for management and control of a Solid-State Disk (SSD);

periodically rescaling the data structures to optimize performance of the SSD based on an age and/or a performance of Non-Volatile Memory (NVM) of the SSD;

wherein the processing element is comprised in a controller of the SSD; and wherein the periodically rescaling results in rescaling at least once during a lifetime of the NVM.

EC56) The tangible computer readable medium of EC55, wherein the at least one rescaling occurs in response to any one of:

initialization of the SSD;

reset of the SSD; and power-ON of the SSD.

EC57) The tangible computer readable medium of EC56, wherein the periodically rescaling is conditional based at least in part on the age and/or the performance of the NVM.

EC58) The tangible computer readable medium of EC57, wherein the operations further comprise maintaining performance statistics of the NVM, and wherein the periodically rescaling is further conditional based at least in part on the performance statistics.

EC59) A system, comprising:

one or more buffer memories;

means for accessing data structures comprised in the buffer memories, the data structures relating to management and control of a Solid-State Disk (SSD);

means for periodically rescaling the data structures to optimize performance of the SSD based on an age and/or a performance of Non-Volatile Memory (NVM) of the SSD; and wherein the means for periodically rescaling rescales at least once during a lifetime of the NVM.

EC60) The system of EC59, wherein the at least one rescaling occurs in response to any one of:

initialization of the SSD;

reset of the SSD; and power-ON of the SSD.

EC61) The system of EC60, wherein the means for periodically rescaling is conditionally operable based at least in part on the age and/or the performance of the NVM.

EC62) The system of EC61, wherein the means for periodically rescaling is further conditionally operable based at least in part on performance statistics maintained relating to the NVM.

EC63) A system, comprising:

a Solid-State Disk (SSD) controller implementing operational communication via one or more external Non-Volatile Memory (NVM) interfaces;

NVM communicatively coupled with the SSD controller via the NVM interfaces;

the SSD controller further comprising an internal, constrained-size memory communicatively coupled with a processor element of the SSD controller;

a plurality of data structures stored within the internal memory and comprising controller management and control information; and means for scaling the data structures based on operational and/or dynamic characteristics of the NVM.

EC64) The system of EC63, wherein the means for scaling is directed to optimize performance over a lifetime of the NVM.

EC65) The system of EC63, wherein the means for scaling is directed to improve performance of the NVM.

EC66) The system of EC63, wherein the system implements an SSD storage system.

EC67) The system of EC63, wherein the internal memory comprises an on-chip random-access memory.

EC68) The system of EC67, further comprising a plurality of profiles each defining a respective group of SSD data structures, and a respective group of data structure scaling directives, the groups of SSD data structures and the groups of data structure scaling directives being for use by the SSD controller to manage and control the NVM.

EC69) The system of EC68, further comprising means for selecting an active one of the profiles based on the operational and/or the dynamic characteristics of the NVM.

EC70) The system of EC69, further comprising means for populating one or more of the data structures stored within the internal memory according to one or more of the data structure scaling directives of the active profile.

EC71) The system of EC70, further comprising means for activating the means for selecting an active one of the profiles and the means for populating the data structures during system initialization.

EC72) The system of EC63, wherein the internal memory is a fixed amount of on-chip memory available for all on-chip data structures used to control and/or manage the NVM.

EC73) The system of EC63, wherein one or more of the data structures comprise all or any portions of one or more of:
- a map usable to convert from a host Logical Block Address (LBA) to a physical address of the NVM;
- a read disturb count tracking a number of reads to one or more blocks and/or regions of the NVM;
- block error statistics tracking error rates observed for one or more blocks of the NVM;
- region error statistics tracking error rates observed for one or more regions of the NVM;
- a program/erase cycle count tracking a number of program/erase cycles of one or more blocks of the NVM;
- free-space tracking;
- NVM management data for code rate, capacity, and status of regions of the NVM;
- host read and/or write data buffering;
- NVM read and/or write data buffering;
- structures used to manage host traffic; and
- scratch space for firmware tasks.

EC74) The system of EC73, wherein the map is in accordance with one or more levels of translation.

EC75) The system of EC74, wherein the map comprises a first-level map stored on-chip, a second level map stored in the NVM, and a cached portion of the second level map stored on-chip.

EC76) The system of EC73, wherein the internal memory comprises one or more buffer memories.

EC77) The system of EC76, wherein a first buffer memory of the buffer memories is located physically closer to at least one of the NVM interfaces and preferentially used to store NVM read and/or write data.

EC78) The system of EC76, wherein a second buffer memory of the buffer memories is more centrally located and preferentially used to store NVM management data.

EC79) The system of EC78, wherein the NVM management data further comprises a portion of the map.

EC80) The system of EC76, wherein a third buffer memory of the buffer memories is located near a host interface and used to buffer and/or store host-related management data and/or host data traffic.

EC81) The system of EC76, wherein the data structures are allocated to static locations in one of the buffer memories when the system is initialized.

EC82) The system of EC81, wherein the system is initialized by being powered on and/or reset.

EC83) The system of EC81, wherein the static allocations are such that all of the data structures fit in the buffer memories in all scenarios without a need for reshuffling any of the static locations.

EC84) The system of EC81, wherein space is reserved for all the data structures at all times.

EC85) The system of EC81, further comprising firmware enabling determining respective size and/or location of each of the statically allocated data structures, and wherein the firmware is executable at one or more of:
- SSD manufacturing;
- SSD formatting;
- SSD power-on; and
- SSD reset.

EC86) The system of EC81, wherein a respective size of each of the statically allocated data structures is variable according to one or more of:
- size of the buffer memories;
- size of the NVM;
- type of the NVM;
- number of die the NVM comprises;
- number of devices the NVM comprises;
- parameters of the NVM, including any one or more of page size and/or block size;
- configuration parameters stored in the NVM;
- configuration information downloaded from a host;
- performance targets; and
- power targets.

EC87) The system of EC86, wherein at least some of the configuration parameters are:
- stored in the NVM when the system is manufactured; and
- retrievable and/or changeable via a configuration program operating via a host interface.

EC88) The system of EC75, wherein a size of a first-level map structure and/or a second-level map page cache structure is varied according to an available amount of the buffer memories after allocating others of a plurality of the data structures.

EC89) The system of EC88, wherein a number of entries per each of a plurality of second-level map pages is determined such that the data structures fully utilize the buffer memories.

EC90) The system of EC89, wherein a number of entries per at least two or more of the second-level map pages is not a power-of-2.

EC91) The system of EC90, wherein a final entry in the first-level map structure selectively indicates a final one of the second-level map pages has a smaller number of entries than others of the second-level map pages.

EC92) The system of EC74, wherein the map comprises one or more of:
- a one-level map;
- a two-level map;
- a multi-level map;
- a direct map; and
- an associative map.

EC93) The system of EC74, wherein a two-level map further comprises a first-level map that associates a first function of a host provided Logical Block Address (LBA) with a respective physical address of one of a plurality of second-level map pages stored in the NVM such that each of the second-level map pages associates a second function of the LBA with a respective address in the NVM of data corresponding to the LBA.

EC94) The system of EC93, wherein the first function of the LBA and the second function of the LBA are respectively a quotient and a remainder obtained when dividing the LBA by a programmable number of entries included in each of the second-level map pages.

EC95) The system of EC63, wherein a firmware image for execution by a processor of the SSD controller is stored and/or available in one or more of:
  on-chip read-only memory;
  on-chip read-write memory;
  downloaded via a host interface;
  a tangible computer-readable media for providing initial firmware and/or firmware patches; and
  in a portion of the NVM.

EC96) The system of EC95, wherein at least a portion of the firmware image is initially executed from the on-chip read-only memory, and subsequently additional portions of the firmware image are provided via an external interface and copied into the on-chip read-write memory.

EC97) The system of EC63, wherein the SSD controller further comprises a flash memory interface enabled to communicate with the NVMs.

EC98) The system of EC63, wherein the NVM comprises one or more flash memories.

EC99) A method, comprising:
  operationally communicating with Non-Volatile Memory (NVM) via one or more external NVM interfaces of a Solid-State Disk (SSD) controller comprising an internal, constrained-size memory communicatively coupled with a processor element of the SSD controller;
  storing a plurality of data structures within the internal memory and comprising controller management and control information; and
  scaling the data structures based on operational and/or dynamic characteristics of the NVM.

EC100) The method of EC99, wherein the scaling is directed to optimize performance over a lifetime of the NVM.

EC101) The method of EC99, wherein the scaling is directed to improve performance of the NVM.

EC102) The method of EC99, wherein the method implements an SSD storage system.

EC103) The method of EC99, wherein the internal memory comprises an on-chip random-access memory.

EC104) The method of EC103, wherein a plurality of profiles each define a respective group of SSD data structures, and a respective group of data structure scaling directives, the groups of SSD data structures and the groups of data structure scaling directives being for use by the SSD controller to manage and control the NVM.

EC105) The method of EC104, further comprising selecting an active one of the profiles based on the operational and/or the dynamic characteristics of the NVM.

EC106) The method of EC105, further comprising populating one or more of the data structures stored within the internal memory according to one or more of the data structure scaling directives of the active profile.

EC107) The method of EC106, further comprising activating the selecting and the populating during system initialization.

EC108) The method of EC99, wherein the internal memory is a fixed amount of on-chip memory available for all on-chip data structures used to control and/or manage the NVM.

EC109) The method of EC99, wherein one or more of the data structures comprise all or any portions of one or more of:
  a map usable to convert from a host Logical Block Address (LBA) to a physical address of the NVM;
  a read disturb count tracking a number of reads to one or more blocks and/or regions of the NVM;
  block error statistics tracking error rates observed for one or more blocks of the NVM;
  region error statistics tracking error rates observed for one or more regions of the NVM;
  a program/erase cycle count tracking a number of program/erase cycles of one or more blocks of the NVM;
  free-space tracking;
  NVM management data for code rate, capacity, and status of regions of the NVM;
  host read and/or write data buffering;
  NVM read and/or write data buffering;
  structures used to manage host traffic; and
  scratch space for firmware tasks.

EC110) The method of EC109, wherein the map is in accordance with one or more levels of translation.

EC111) The method of EC110, wherein the map comprises a first-level map stored on-chip, a second level map stored in the NVM, and a cached portion of the second level map stored on-chip.

EC112) The method of EC109, wherein the internal memory comprises one or more buffer memories.

EC113) The method of EC112, wherein a first buffer memory of the buffer memories is located physically closer to at least one of the NVM interfaces and preferentially used to store NVM read and/or write data.

EC114) The method of EC112, wherein a second buffer memory of the buffer memories is more centrally located and preferentially used to store NVM management data.

EC115) The method of EC114, wherein the NVM management data further comprises a portion of the map.

EC116) The method of EC112, wherein a third buffer memory of the buffer memories is located near a host interface and used to buffer and/or store host-related management data and/or host data traffic.

EC117) The method of EC112, further comprising allocating the data structures to static locations in one of the buffer memories when the method is initialized.

EC118) The method of EC117, wherein the method is initialized by being powered on and/or reset.

EC119) The method of EC117, wherein the static allocations are such that all of the data structures fit in the buffer memories in all scenarios without a need for reshuffling any of the static locations.

EC120) The method of EC117, wherein space is reserved for all the data structures at all times.

EC121) The method of EC117, further comprising executing firmware to determine respective size and/or location of each of the statically allocated data structures, and wherein the execution is at one or more of:
  SSD manufacturing;
  SSD formatting;
  SSD power-on; and
  SSD reset.

EC122) The method of EC117, wherein a respective size of each of the statically allocated data structures is variable according to one or more of:
  size of the buffer memories;
  size of the NVM;
  type of the NVM;
  number of die the NVM comprises;
  number of devices the NVM comprises;
  parameters of the NVM, including any one or more of page size and/or block size;
  configuration parameters stored in the NVM;
  configuration information downloaded from a host;
  performance targets; and
  power targets.

EC123) The method of EC122, wherein at least some of the configuration parameters are:
  stored in the NVM during manufacturing; and
  retrievable and/or changeable via a configuration program operating via a host interface.

EC124) The method of EC111, further comprising varying a size of a first-level map structure and/or a second-level map page cache structure according to an available amount of the buffer memories after allocating others of a plurality of the data structures.

EC125) The method of EC124, further comprising determining a number of entries per each of a plurality of second-level map pages such that the data structures fully utilize the buffer memories.

EC126) The method of EC125, wherein a number of entries per at least two or more of the second-level map pages is not a power-of-2.

EC127) The method of EC126, wherein a final entry in the first-level map structure selectively indicates a final one of the second-level map pages has a smaller number of entries than others of the second-level map pages.

EC128) The method of EC110, wherein the map comprises one or more of:
  a one-level map;
  a two-level map;
  a multi-level map;
  a direct map; and
  an associative map.

EC129) The method of EC110, wherein a two-level map further comprises a first-level map that associates a first function of a host provided Logical Block Address (LBA) with a respective physical address of one of a plurality of second-level map pages stored in the NVM such that each of the second-level map pages associates a second function of the LBA with a respective address in the NVM of data corresponding to the LBA.

EC130) The method of EC129, wherein the first function of the LBA and the second function of the LBA are respectively a quotient and a remainder obtained when dividing the LBA by a programmable number of entries included in each of the second-level map pages.

EC131) The method of EC99, wherein a firmware image for execution by a processor of the SSD controller is stored and/or available in one or more of:
  on-chip read-only memory;
  on-chip read-write memory;
  downloaded via a host interface;
  a tangible computer-readable media for providing initial firmware and/or firmware patches; and
  in a portion of the NVM.

EC132) The method of EC131, further comprising initially executing at least a portion of the firmware image from the on-chip read-only memory, and subsequently providing additional portions of the firmware image via an external interface and copying same into the on-chip read-write memory.

EC133) The method of EC99, wherein the SSD controller further comprises a flash memory interface enabled to communicate with the NVMs.

EC134) The method of EC99, wherein the NVM comprises one or more flash memories.

EC135) An apparatus, comprising:
  a Solid-State Disk (SSD) controller implementing operational communication via one or more external Non-Volatile Memory (NVM) interfaces;
  NVM communicatively coupled with the SSD controller via the NVM interfaces;
  the SSD controller further comprising an internal, constrained-size memory communicatively coupled with a processor element of the SSD controller;
  a plurality of data structures stored within the internal memory and comprising controller management and control information; and
  hardware logic circuitry enabled to scale the data structures based on operational and/or dynamic characteristics of the NVM.

EC136) The apparatus of EC135, wherein the scaling is directed to optimize performance over a lifetime of the NVM and/or to improve performance of the NVM.

EC137) The apparatus of EC135, wherein the internal memory comprises an on-chip random-access memory.

EC138) The apparatus of EC137, further comprising a plurality of profiles each defining a respective group of SSD data structures, and a respective group of data structure scaling directives, the groups of SSD data structures and the groups of data structure scaling directives being for use by the SSD controller to manage and control the NVM.

EC139) A tangible computer readable medium having a set of instructions stored therein that when executed by a processing element cause the processing element to perform and/or control operations comprising:
  operationally communicating with Non-Volatile Memory (NVM) via one or more external NVM interfaces of a Solid-State Disk (SSD) controller comprising an internal, constrained-size memory communicatively coupled with a processor of the SSD controller;
  storing a plurality of data structures within the internal memory and comprising controller management and control information;
  scaling the data structures based on operational and/or dynamic characteristics of the NVM; and
  wherein the processor comprises the processing element.

EC140) The tangible computer readable medium of EC139, wherein the scaling is directed to optimize performance over a lifetime of the NVM and/or to improve performance of the NVM.

EC141) The tangible computer readable medium of EC139, wherein the internal memory comprises an on-chip random-access memory.

EC142) The tangible computer readable medium of EC141, wherein the tangible computer readable medium comprises a plurality of profiles each defining a respective group of SSD data structures, and a respective group of data structure scaling directives, the groups of SSD data structures and the groups of data structure scaling directives being for use by the SSD controller to manage and control the NVM.

EC143) A method, comprising:
  managing and controlling operations of a Solid-State Disk (SSD) using a family of data structures populated and maintained in a constrained-sized, data structure memory of a controller of the SSD, the data structure memory being communicatively coupled with functional elements of the SSD controller; and
  scaling size and precision of members of the data structure family according to operational and dynamic characteristics of the SSD and Non-Volatile Memory (NVM) elements of the SSD.

EC144) The method of EC143, wherein, as the NVM elements age and/or operational requirements of the SSD change, any one or more of a number, a size, and a precision of at least one of the data structures are adjusted to enable improved management of the SSD.

EC145) The method of EC143, further comprising data structure creating and scaling by firmware at power-ON sequencing of the SSD.

EC146) The method of EC145, wherein the data structures comprise usage statistics of the NVM elements, and the power-ON creation and scaling evaluates the usage statistics in determining how to allocate data structure space in the data structure memory to improve management of performance characteristics of the SSD.

EC147) An apparatus, comprising:
- management and control hardware logic circuitry enabled to manage and control operations of a Solid-State Disk (SSD) using a family of data structures populated and maintained in a constrained-sized, data structure memory of a controller of the SSD, the data structure memory being communicatively coupled with functional elements of the SSD controller;
- scaling hardware logic circuitry enabled to scale size and precision of members of the data structure family according to operational and dynamic characteristics of the SSD and Non-Volatile Memory (NVM) elements of the SSD; and
- wherein the SSD controller comprises the apparatus.

EC148) The apparatus of EC147, wherein, as the NVM elements age and/or operational requirements of the SSD change, any one or more of a number, a size, and a precision of at least one of the data structures are adjusted to enable improved management of the SSD.

EC149) The apparatus of EC147, wherein data structure creating and scaling are performed at power-ON sequencing of the SSD.

EC150) The apparatus of EC149, wherein the data structures comprise usage statistics of the NVM elements, and the power-ON creation and scaling evaluates the usage statistics in determining how to allocate data structure space in the data structure memory to improve management of performance characteristics of the SSD.

EC151) A tangible computer readable medium having a set of instructions stored therein that when executed by a processing element cause the processing element to perform and/or control operations comprising:
- managing and controlling operations of a Solid-State Disk (SSD) using a family of data structures populated and maintained in a constrained-sized, data structure memory of a controller of the SSD, the data structure memory being communicatively coupled with functional elements of the SSD controller;
- scaling size and precision of members of the data structure family according to operational and dynamic characteristics of the SSD and Non-Volatile Memory (NVM) elements of the SSD; and
- wherein the SSD controller comprises the processing element.

EC152) The tangible computer readable medium of EC151, wherein, as the NVM elements age and/or operational requirements of the SSD change, any one or more of a number, a size, and a precision of at least one of the data structures are adjusted to enable improved management of the SSD.

EC153) The tangible computer readable medium of EC151, wherein data structure creating and scaling are performed at power-ON sequencing of the SSD.

EC154) The tangible computer readable medium of EC153, wherein the data structures comprise usage statistics of the NVM elements, and the power-ON creation and scaling evaluates the usage statistics in determining how to allocate data structure space in the data structure memory to improve management of performance characteristics of the SSD.

EC155) A system, comprising:
- means for managing and controlling operations of a Solid-State Disk (SSD) using a family of data structures populated and maintained in a constrained-sized, data structure memory of a controller of the SSD, the data structure memory being communicatively coupled with functional elements of the SSD controller; and
- means for scaling size and precision of members of the data structure family according to operational and dynamic characteristics of the SSD and Non-Volatile Memory (NVM) elements of the SSD.

EC156) The system of EC155, wherein, as the NVM elements age and/or operational requirements of the SSD change, any one or more of a number, a size, and a precision of at least one of the data structures are adjusted to enable improved management of the SSD.

EC157) The system of EC155, wherein data structure creating and scaling are performed at power-ON sequencing of the SSD.

EC158) The system of EC157, wherein the data structures comprise usage statistics of the NVM elements, and the power-ON creation and scaling evaluates the usage statistics in determining how to allocate data structure space in the data structure memory to improve management of performance characteristics of the SSD.

EC159) A method, comprising:
- associating members of a family of data structures for use in managing and controlling operation of a Solid-State Disk (SSD) having an internal data structure memory of limited capacity with usefulness criteria with respect to age and performance of Non-Volatile Memory (NVM) used in the SSD and to usage characteristics of the SSD; and
- populating and scaling, at least in part via a controller of the SSD, the associated data structures in the limited capacity memory to optimize SSD performance based at least in part on the usefulness criteria.

EC160) The method of EC159, wherein the usefulness criteria associated with a first one of the members and relating to a size of the first member are such that as the age increases and/or the performance decreases, the size of the first member increases; and the usefulness criteria associated with a second one of the members and relating to a size of the second member are such that as the age increases and/or the performance decreases, the size of the second member decreases.

EC161) The method of EC159, wherein the usefulness criteria associated with a first one of the members and relating to a precision of the first member are such that as the age increases and/or the performance decreases, the precision of the first member increases; and the usefulness criteria associated with a second one of the members and relating to a precision of the second member are such that as the age increases and/or the performance decreases, the precision of the second member decreases.

EC162) The method of EC159, further comprising using firmware for the populating and scaling.

EC163) The method of EC159, wherein the populating and scaling is in response to selected power-ON initializations of the SSD.

EC164) An apparatus, comprising:
- management and control hardware logic circuitry enabled to associate members of a family of data structures for use in managing and controlling operation of a Solid-State Disk (SSD) having an internal data structure memory of limited capacity with usefulness criteria with respect to age and performance of Non-Volatile Memory (NVM) used in the SSD and to usage characteristics of the SSD; and populating and scaling hardware logic circuitry of a controller of the SSD enabled to populate and scale the associated data structures in the limited capacity memory to optimize SSD performance based at least in part on the usefulness criteria.

EC165) The apparatus of EC164, wherein the usefulness criteria associated with a first one of the members and relating to a size of the first member are such that as the age increases and/or the performance decreases, the size of the first member increases; and the usefulness criteria associated with a second one of the members and relating to a size of the second member are such that as the age increases and/or the performance decreases, the size of the second member decreases.

EC166) The apparatus of EC164, wherein the usefulness criteria associated with a first one of the members and relating to a precision of the first member are such that as the age increases and/or the performance decreases, the precision of the first member increases; and the usefulness criteria associated with a second one of the members and relating to a precision of the second member are such that as the age increases and/or the performance decreases, the precision of the second member decreases.

EC167) The apparatus of EC164, wherein the populating and scaling hardware logic circuitry comprises firmware.

EC168) The apparatus of EC164, wherein the populating and scaling hardware logic circuitry is responsive to selected power-ON initializations of the SSD.

EC169) A tangible computer readable medium having a set of instructions stored therein that when executed by a processing element cause the processing element to perform and/or control operations comprising:

associating members of a family of data structures for use in managing and controlling operation of a Solid-State Disk (SSD) having an internal data structure memory of limited capacity with usefulness criteria with respect to age and performance of Non-Volatile Memory (NVM) used in the SSD and to usage characteristics of the SSD;

populating and scaling, at least in part via a controller of the SSD, the associated data structures in the limited capacity memory to optimize SSD performance based at least in part on the usefulness criteria; and wherein the SSD controller comprises the processing element.

EC170) The tangible computer readable medium of EC169, wherein the usefulness criteria associated with a first one of the members and relating to a size of the first member are such that as the age increases and/or the performance decreases, the size of the first member increases; and the usefulness criteria associated with a second one of the members and relating to a size of the second member are such that as the age increases and/or the performance decreases, the size of the second member decreases.

EC171) The tangible computer readable medium of EC169, wherein the usefulness criteria associated with a first one of the members and relating to a precision of the first member are such that as the age increases and/or the performance decreases, the precision of the first member increases; and the usefulness criteria associated with a second one of the members and relating to a precision of the second member are such that as the age increases and/or the performance decreases, the precision of the second member decreases.

EC172) The tangible computer readable medium of EC169, wherein the populating and scaling is in response to selected power-ON initializations of the SSD.

EC173) A system, comprising:

means for associating members of a family of data structures for use in managing and controlling operation of a Solid-State Disk (SSD) having an internal data structure memory of limited capacity with usefulness criteria with respect to age and performance of Non-Volatile Memory (NVM) used in the SSD and to usage characteristics of the SSD; and means for populating and scaling, at least in part via a controller of the SSD, the associated data structures in the limited capacity memory to optimize SSD performance based at least in part on the usefulness criteria.

EC174) The system of EC173, wherein the usefulness criteria associated with a first one of the members and relating to a size of the first member are such that as the age increases and/or the performance decreases, the size of the first member increases; and the usefulness criteria associated with a second one of the members and relating to a size of the second member are such that as the age increases and/or the performance decreases, the size of the second member decreases.

EC175) The system of EC173, wherein the usefulness criteria associated with a first one of the members and relating to a precision of the first member are such that as the age increases and/or the performance decreases, the precision of the first member increases; and the usefulness criteria associated with a second one of the members and relating to a precision of the second member are such that as the age increases and/or the performance decreases, the precision of the second member decreases.

EC176) The system of EC173, wherein the means for the populating and scaling is implemented at least in part via firmware.

EC177) The system of EC173, wherein the means for populating and scaling is responsive to selected power-ON initializations of the SSD.

EC178) A method, comprising:

managing and controlling a Solid-State Disk (SSD) using scaled data structures stored in an on-chip, random-access memory of a controller of the SSD, the random-access memory being of limited size just sufficient to store all of the scaled data structures at a same time;

rescaling the scaled data structures, at least one time throughout a lifetime of Non-Volatile Memory (NVM) of the SSD, to optimize performance of the SSD based on age and/or performance of the NVM; and wherein the rescaling comprises changing one or more of granularity and resolution of one or more entries of at least one of the scaled data structures.

EC179) The method of EC178, wherein one or more entries of one or more of the scaled data structures are managed as respective saturating counters.

EC180) The method of EC178, wherein the rescaling comprises sampling to reduce a number of entries of one or more of the scaled data structures.

EC181) The method of EC178, wherein the rescaling comprises sampling to reduce a size of at least one entry of at least one of the scaled data structures.

EC182) The method of EC178, wherein the rescaling occurs periodically throughout the lifetime.

EC183) The method of EC178, wherein the rescaling comprises reducing size and/or granularity of a first data structure, and increasing size and/or granularity of a second data structure to, as fully as possible, utilize limited storage space in the random-access memory while optimizing performance of the SSD and/or while attempting to achieve a particular performance target.

EC184) An apparatus, comprising:
- a Solid-State Disk (SSD) controller comprising an on-chip, random-access memory;
- hardware logic circuitry enabled to manage and control an SSD using scaled data structures stored in the random-access memory, the random-access memory being of limited size just sufficient to store all of the scaled data structures at a same time;
- wherein the hardware logic circuitry is used to rescale the scaled data structures, at least one time throughout a lifetime of Non-Volatile Memory (NVM) of the SSD, to optimize performance of the SSD based on age and/or performance of the NVM; and
- wherein the rescaling comprises changing one or more of granularity and resolution of one or more entries of at least one of the scaled data structures.

EC185) The apparatus of EC184, wherein the hardware logic circuitry is further enabled to manage one or more entries of one or more of the scaled data structures as respective saturating counters.

EC186) The apparatus of EC184, wherein the rescaling comprises sampling to reduce a number of entries of one or more of the scaled data structures.

EC187) The apparatus of EC184, wherein the rescaling comprises sampling to reduce a size of at least one entry of at least one of the scaled data structures.

EC188) The apparatus of EC184, wherein the rescaling occurs periodically throughout the lifetime.

EC189) The apparatus of EC184, wherein the rescaling comprises reducing size and/or granularity of a first data structure, and increasing size and/or granularity of a second data structure to, as fully as possible, utilize limited storage space in the random-access memory while optimizing performance of the SSD and/or while attempting to achieve a particular performance target.

EC190) A tangible computer readable medium having a set of instructions stored therein that when executed by a processing element cause the processing element to perform and/or control operations comprising:
- managing and controlling a Solid-State Disk (SSD) using scaled data structures stored in an on-chip, random-access memory of a controller of the SSD, the random-access memory being of limited size just sufficient to store all of the scaled data structures at a same time;
- rescaling the scaled data structures, at least one time throughout a lifetime of Non-Volatile Memory (NVM) of the SSD, to optimize performance of the SSD based on age and/or performance of the NVM; and
- wherein the rescaling comprises changing one or more of granularity and resolution of one or more entries of at least one of the scaled data structures.

EC191) The tangible computer readable medium of EC190, wherein one or more entries of one or more of the scaled data structures are managed as respective saturating counters.

EC192) The tangible computer readable medium of EC190, wherein the rescaling comprises sampling to reduce a number of entries of one or more of the scaled data structures.

EC193) The tangible computer readable medium of EC190, wherein the rescaling comprises sampling to reduce a size of at least one entry of at least one of the scaled data structures.

EC194) The tangible computer readable medium of EC190, wherein the rescaling occurs periodically throughout the lifetime.

EC195) The tangible computer readable medium of EC190, wherein the rescaling comprises reducing size and/or granularity of a first data structure, and increasing size and/or granularity of a second data structure to, as fully as possible, utilize limited storage space in the random-access memory while optimizing performance of the SSD and/or while attempting to achieve a particular performance target.

EC196) A system, comprising:
- means for managing and controlling a Solid-State Disk (SSD) using scaled data structures stored in an on-chip, random-access memory of a controller of the SSD, the random-access memory being of limited size just sufficient to store all of the scaled data structures at a same time;
- means for rescaling the scaled data structures, at least one time throughout a lifetime of Non-Volatile Memory (NVM) of the SSD, to optimize performance of the SSD based on age and/or performance of the NVM; and
- wherein the means for rescaling comprises means for changing one or more of granularity and resolution of one or more entries of at least one of the scaled data structures.

EC197) The system of EC196, wherein one or more entries of one or more of the scaled data structures are managed as respective saturating counters.

EC198) The system of EC196, wherein the means for rescaling comprises means for sampling to reduce a number of entries of one or more of the scaled data structures.

EC199) The system of EC196, wherein the means for rescaling comprises means for sampling to reduce a size of at least one entry of at least one of the scaled data structures.

EC200) The system of EC196, wherein the means for rescaling is activated periodically throughout the lifetime.

EC201) The system of EC196, wherein the means for rescaling comprises means for reducing size and/or granularity of a first data structure, and means for increasing size and/or granularity of a second data structure to, as fully as possible, utilize limited storage space in the random-access memory while optimizing performance of the SSD and/or while attempting to achieve a particular performance target.

EC202) The system of EC1, EC35, EC63, EC155, EC173, or EC196, wherein the SSD controller further comprises one or more host interfaces enabled to exchange data with one or more hosts, and at least one of the host interfaces is compatible with one or more storage interface standards.

EC203) The method of EC14, EC38, EC47, EC99, EC143, EC159, or EC178, further comprising the SSD controller exchanging data with one or more hosts, the data exchanging being via one or more host interfaces of the SSD controller, and at least one of the host interfaces is compatible with one or more storage interface standards.

EC204) The system of EC1, EC35, EC63, EC155, EC173, or EC196, wherein the SSD controller further comprises a flash memory interface, and the communication with the NVMs is at least in part via the flash memory interface.

EC205) The method of EC14, EC38, EC47, EC99, EC143, EC159, or EC178, wherein the SSD controller further comprises a flash memory interface, and further comprising communicating with the NVMs at least in part via the flash memory interface.

EC206) Any of the foregoing ECs having or referring to an SSD controller, wherein the SSD controller is implemented in a single integrated circuit.

EC207) Any of the foregoing ECs having or referring to an SSD controller and at least one NVM, wherein the SSD controller is enabled to interface to the NVMs and is implemented in a single integrated circuit.

EC208) Any of the foregoing ECs having or referring to at least one NVM, wherein the at least one of the NVM comprises at least one flash memory.

EC209) Any of the foregoing ECs having or referring to a storage interface standard, wherein the storage interface standard comprises one or more of
- a Universal Serial Bus (USB) interface standard,
- a Compact Flash (CF) interface standard,
- a MultiMediaCard (MMC) interface standard,
- an embedded MMC (eMMC) interface standard,
- a Thunderbolt interface standard,
- a UFS interface standard,
- a Secure Digital (SD) interface standard,
- a Memory Stick interface standard,
- an xD-picture card interface standard,
- an Integrated Drive Electronics (IDE) interface standard,
- a Serial Advanced Technology Attachment (SATA) interface standard,
- an external SATA (eSATA) interface standard,
- a Small Computer System Interface (SCSI) interface standard,
- a Serial Attached Small Computer System Interface (SAS) interface standard,
- a Fibre Channel interface standard,
- an Ethernet interface standard, and
- a Peripheral Component Interconnect express (PCIe) interface standard.

EC210) Any of the foregoing ECs having or referring to a host, wherein the host comprises one or more of
- a computer,
- a workstation computer,
- a server computer,
- a storage server,
- a Storage Attached Network (SAN),
- a Network Attached Storage (NAS) device,
- a Direct Attached Storage (DAS) device,
- a storage appliance,
- a Personal Computer (PC),
- a laptop computer,
- a notebook computer,
- a netbook computer,
- a tablet device or computer,
- an ultrabook computer,
- an electronic reading device (an e-reader),
- a Personal Digital Assistant (PDA),
- a navigation system,
- a (handheld) Global Positioning System (GPS) device,
- an automotive control system,
- an automotive media control system or computer,
- a printer, copier or fax machine or all-in-one device,
- a Point Of Sale POS device,
- a cash-register,
- a media player,
- a television,
- a media recorder,
- a Digital Video Recorder (DVR),
- a digital camera,
- a cellular handset,
- a cordless telephone handset, and
- an electronic game.

EC211) Any of the foregoing ECs having or referring to a flash memory interface, wherein the flash memory interface is compatible with one or more of
- an Open NAND Flash Interface (ONFI),
- a Toggle-mode interface,
- a Double-Data-Rate (DDR) synchronous interface,
- a DDR2 synchronous interface;
- a synchronous interface, and
- an asynchronous interface.

EC212) Any of the foregoing ECs having or referring to at least one flash memory, wherein at least a portion of the at least one flash memory comprises one or more of
- NAND flash technology storage cells, and
- NOR flash technology storage cells.

EC213) Any of the foregoing ECs having or referring to at least one flash memory, wherein at least a portion of the at least one flash memory comprises one or more of
- Single-Level Cell (SLC) flash technology storage cells, and
- Multi-Level Cell (MLC) flash technology storage cells.

EC214) Any of the foregoing ECs having or referring to at least one flash memory, wherein at least a portion of the at least one flash memory comprises one or more of
- polysilicon technology-based charge storage cells, and
- silicon nitride technology-based charge storage cells.

EC215) Any of the foregoing ECs having or referring to at least one flash memory, wherein at least a portion of the at least one flash memory comprises one or more of
- two-dimensional technology-based flash memory technology, and
- three-dimensional technology-based flash memory technology.

System

In some embodiments, an I/O device (such as an SSD) is enabled to provide storage for a host (such as a computing host). The I/O device includes a controller (such as an SSD controller) enabled to interface with the host via a host interface. The SSD controller acts as a bridge between the host interface and NVM of the SSD, and executes commands of a host protocol sent from the host via the host interface. At least some of the commands direct the SSD to write and read the NVM with data sent from and to the host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level redundancy and/or error correction, higher-level redundancy and/or error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1A illustrates selected details of an embodiment of an SSD including an SSD controller using scalable data structures (e.g. Scaled Data Structures 126 as stored in Control RAM 125) for control and management of non-volatile storage, such as flash memories. SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, Control RAM 125, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131. Control RAM 125 provides storage for Scaled Data Structures 126.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
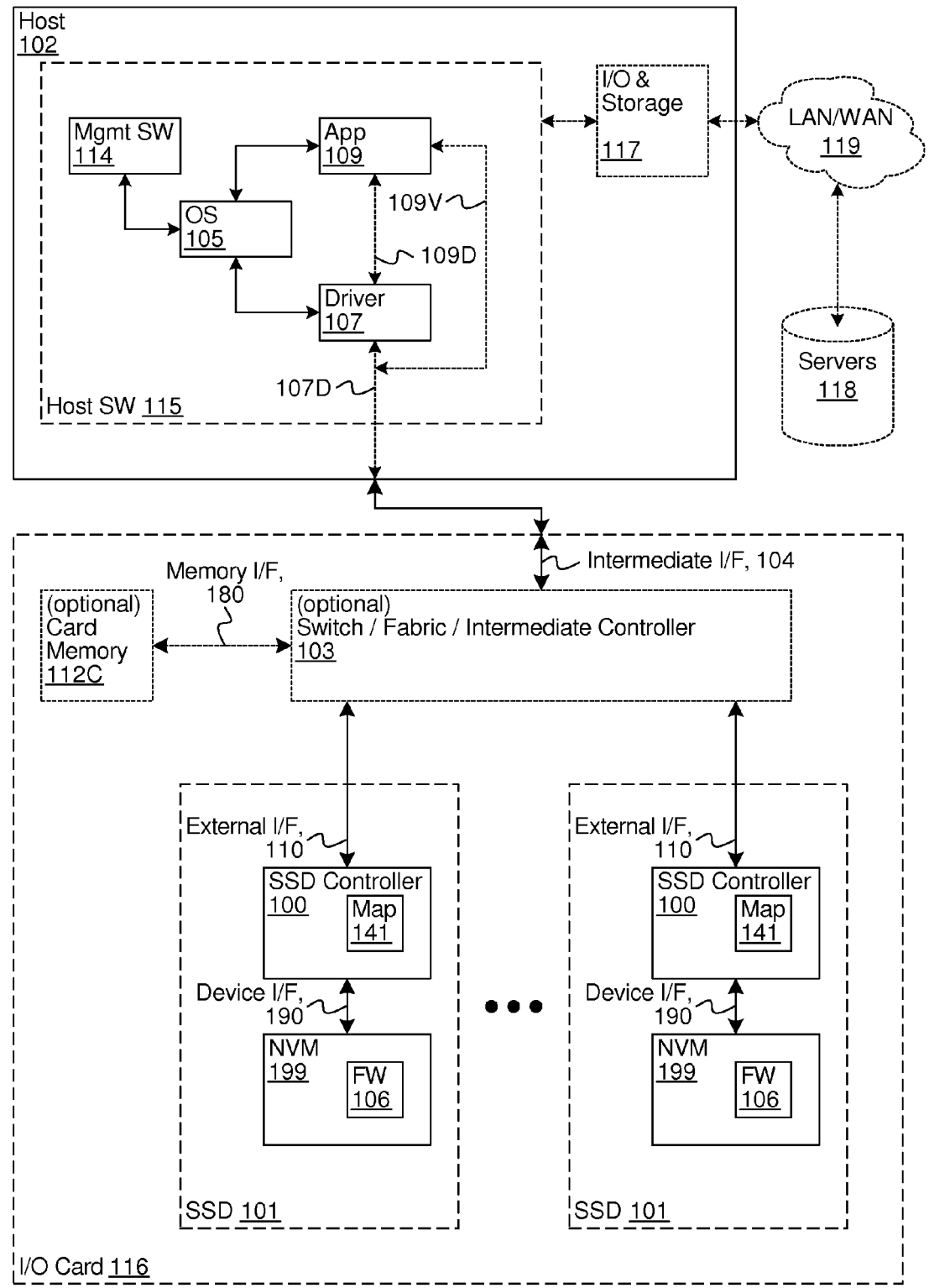
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software ←→ I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application ←→ I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application ←→ I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Scalable Data Structures

Figure 2A:
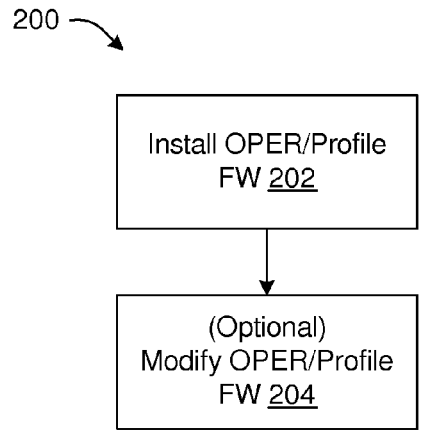
FIG. 2A illustrates selected details of an embodiment of installation of firmware and modification of installed firmware in the SSD controller of FIGS. 1A and 1B.

FIG. 2A illustrates selected details of an embodiment of installation of firmware and modification of installed firmware in a controller of an SSD (e.g. Controller 100 of FIGS. 1A and 1B). The details are designated generally by reference numeral 200. In various embodiments, data structures are scaled offline and are made part of a firmware image that is installed (or is activated) in the controller, as illustrated at Install OPER/Profile Firmware 202. In some embodiments, the initial firmware installation is optionally modified ((Optional) Modify OPER/profile Firmware 204) by, for example, updating a portion of an initial firmware installation by download from a host, to enable a standardized product to be specialized for particular host interfaces, specific NVM types, sizes, and/or to enable a product to be upgraded.

Figure 2B:
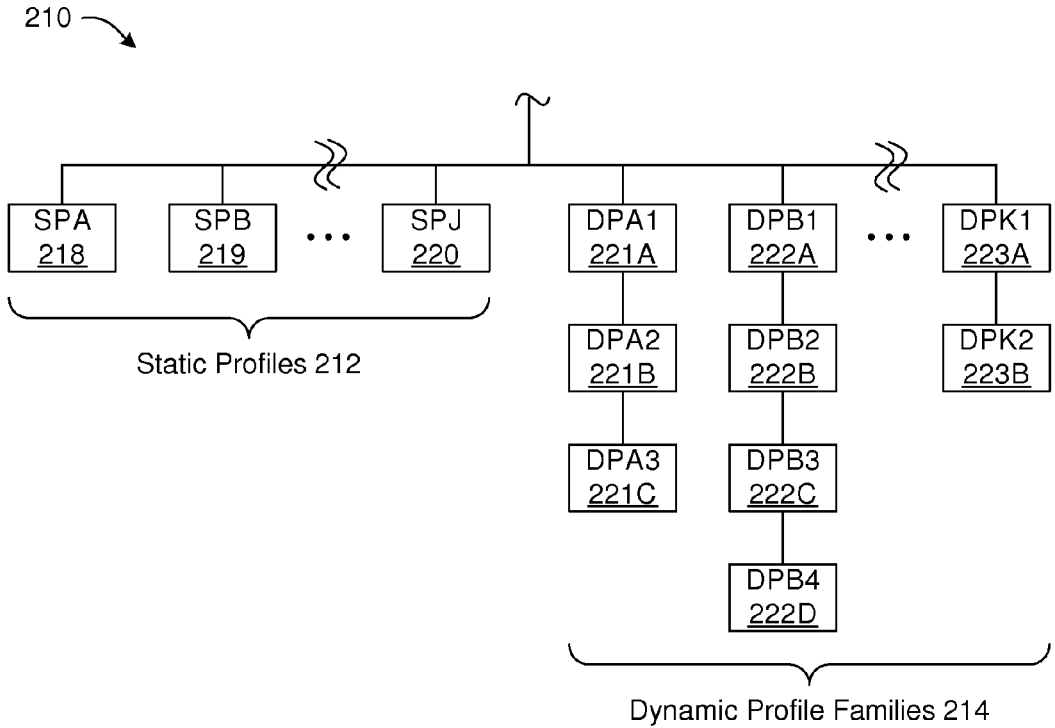
FIG. 2B illustrates selected details of static profiles and dynamic profile families of data structures for control and management of non-volatile storage.
Figure 4A:
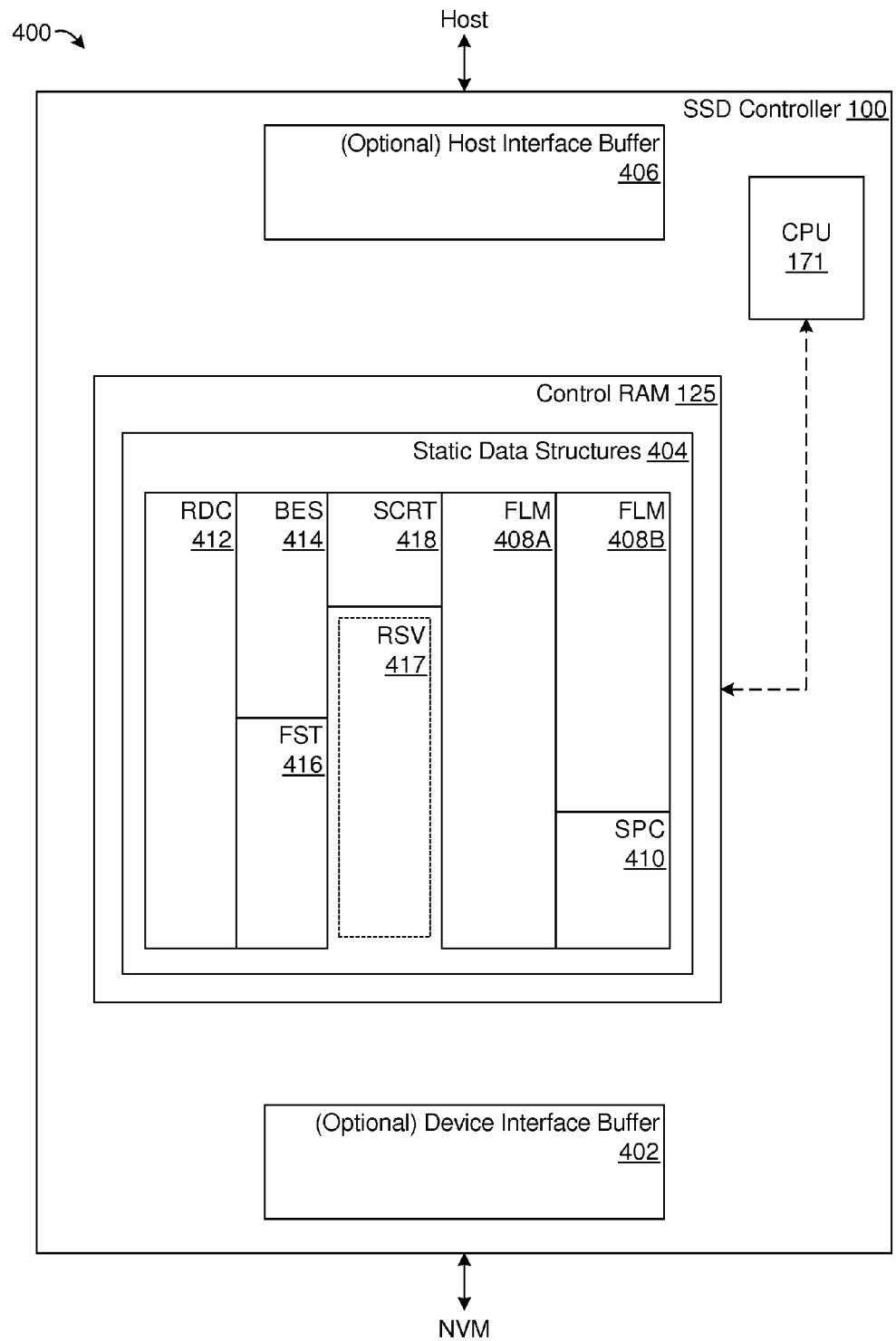
FIG. 4A illustrates an example of scaled static data structures for control and management of the Non-Volatile Memory (NVM) coupled to the SSD controller of FIGS. 1A and 1B.
Figure 4B:
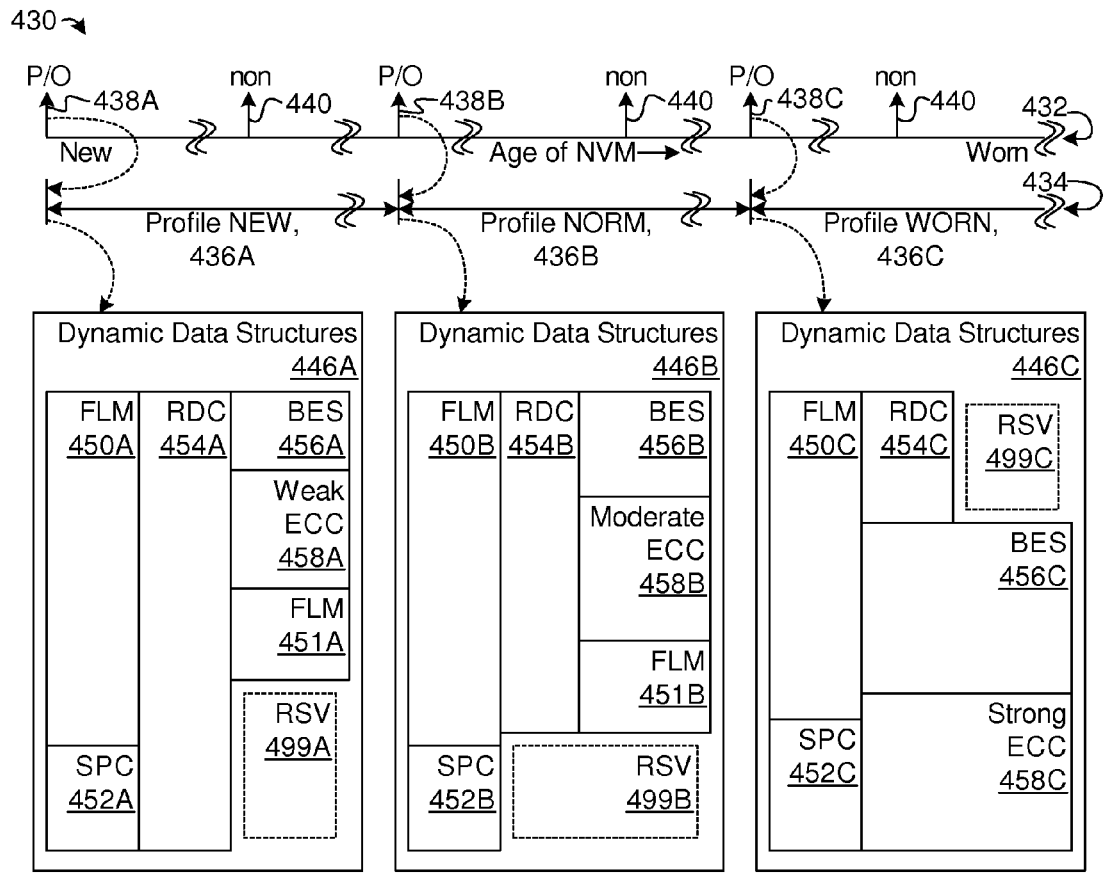
FIG. 4B illustrates an example of sequentially rescaled dynamic data structures for control and management of the NVM coupled to the SSD controller of FIGS. 1A and 1B.

According to various embodiments, a firmware image (such as represented by Firmware 106 of FIG. 1B) is executed by a processor of the SSD (e.g., CPU 171 of SSD Controller 100, FIG. 1A). The firmware image includes and/or specifies configurations of scaled data structures that are used by the processor for control and management of NVM operations. The scaled data structure configurations are examples of data structure profiles, such as illustrated by FIGS. 2B, 4A, and 4B. The firmware image is stored and/or available in one or more of: an on-chip ROM; an on-chip RAM; downloaded via a Host interface; an EPROM or similar device coupled to or part of the SSD for providing initial firmware and/or firmware patches; and in a portion of NVM providing storage for the SSD. In some embodiments, the firmware image is initially executed from the on-chip ROM, and subsequently additional portions of the firmware image are provided via an external interface and copied into on-chip RAM.

FIG. 2B illustrates selected details of static profiles and dynamic profile families of data structures for control and management of non-volatile storage. The profiles and profile families are designated generally by reference numeral 210, and include Static Profiles 212 and Dynamic Profile Families 214.

An example of Static Profiles 212 is a specific configuration of scaled data structures for management and control of the NVM storage. The data structures of a static profile are based on fixed parameters that are known beforehand (e.g. at design or manufacturing time of the SSD) and, in some usage scenarios and/or embodiments, remain relatively unchanged throughout a lifetime of a storage element (such as NVM of the NVM storage, the NVM storage, and a storage system (such as an SSD) implemented via the NVM storage). Thus a static profile is used throughout an entire lifetime of the storage element, or until such time as a firmware update necessitates use of a different configuration of scaled data structures. Various examples of static profiles are illustrated as Static profiles SPA 218, and SPB 219, through SPJ 220.

An example of a dynamic profile family is a sequence of related static profiles that data structures are progressively rescaled for, from one profile to a next, to optimize performance of an SSD throughout a lifetime of NVM of the SSD. Rescaling of data structures occurs following events such as a system initialization or reset, and is performed, e.g., by execution of the firmware image.

Examples of Dynamic profile families 214 are illustrated as DPA1 221A, DPA2 221B, and DPA3 221C, DPB1-4 222A-D, and DPK1-2 223A-B. The data structures of the individual profiles of a dynamic profile family are based in part on parameters known beforehand (e.g. at design or manufacturing time of the SSD) and that remain relatively unchanged, but are also based on parameters such as the age and/or performance of NVM that change over the lifetime of the NVM—as the NVM ages, the performance tends to decline relatively slowly. A dynamic profile family is intended for use over a complete lifetime of an SSD/NVM/Product, but unlike Static profile SPA 218, having one set of data structures used for the lifetime of a product, the data structures of a dynamic family are updated at least one time during the lifetime. An example of a dynamic profile family is a collection of related static profiles, with different ones of the related static profiles used during respective different portions of lifetime of a particular NVM (or alternatively an SSD using NVM). For example, an early-stage profile of data structures (e.g., DPA1 221A) is used when NVM is relatively new, then a later-stage profile of data structures (DPA2 221B) is used as the NVM ages, and so forth.

Some embodiments and/or usage scenarios, such as some consumer products, attain a required level of performance and reliability using a single static profile throughout the product lifetime. Other embodiments and/or usage scenarios, such as enterprise products, attain a relatively high level of performance and reliability using rescaling of data structures periodically throughout the product lifetime.

In some embodiments, rescaling is planned offline during a design phase of system profiles. The rescaled data structures are made a part of individual profiles of a dynamic profile family, and then periodically, for example, at a system initialization, an appropriate next profile is selected for use. Thus, some data structures are rescaled periodically (e.g., at least one time) during a product lifetime. In other embodiments and/or usage scenarios, a portion of the planning is performed during a design phase and another portion is performed during operation. For example, a technique for rescaling based on age and/or performance criteria is implemented in the firmware image. When the firmware image is loaded during a system initialization, execution of the firmware performs the rescaling technique. When/if it is time to adjust data structures to track performance changes in NVM (e.g. of an SSD), then most recent data structures are rescaled and used to populate data structure memory (e.g., control RAM 125 of FIG. 1A). Whether pre-designed profiles provide rescaling, as in FIG. 2B, firmware performs rescaling of the most recent data structures (not illustrated), or some other technique implements rescaling, once rescaling is completed, the SSD becomes operational, and a processor (e.g. of a controller of the SSD) uses the populated data structures in the data structure memory to control and/or manage the NVM.

In the dynamic scenario, the Dynamic profiles DPA1 221A, DPA2 221B, and DPA3 221C are progressively invoked as NVM ages. In each profile of the dynamic profile family DPA1-3, data structures have been progressively rescaled to maintain optimum performance of an SSD. The progressive rescaling includes, for example, an initial use of a large RDC data structure of a size that is progressively reduced as NVM of the SSD becomes more fully utilized over time. As the size of the RDC data structure is progressively reduced from one profile of a dynamic family to a next, space is freed in a control RAM containing the RDC data structure. The freed space enables an increase in the size of map structures used to convert host LBAs to NVM physical addresses, and thus reduces write amplification. In some contexts, an integer division mapping feature enables further compression of map structure size.

In various embodiments, when an SSD application uses a static profile, then when system firmware is initialized, the static profile defines the data structures that are loaded into a control RAM. When an SSD application uses a dynamic profile family, an initial firmware startup uses a first profile of the family to define data structures and then, periodically, the performance of NVM is examined to determine whether to select a next profile of the family for rescaling the data structures. Thus, the data structures that were defined offline, ahead of time (e.g. at design or manufacturing time of the SSD), continue to be optimized throughout the lifetime of the NVM.

Figures 3A, 3B:
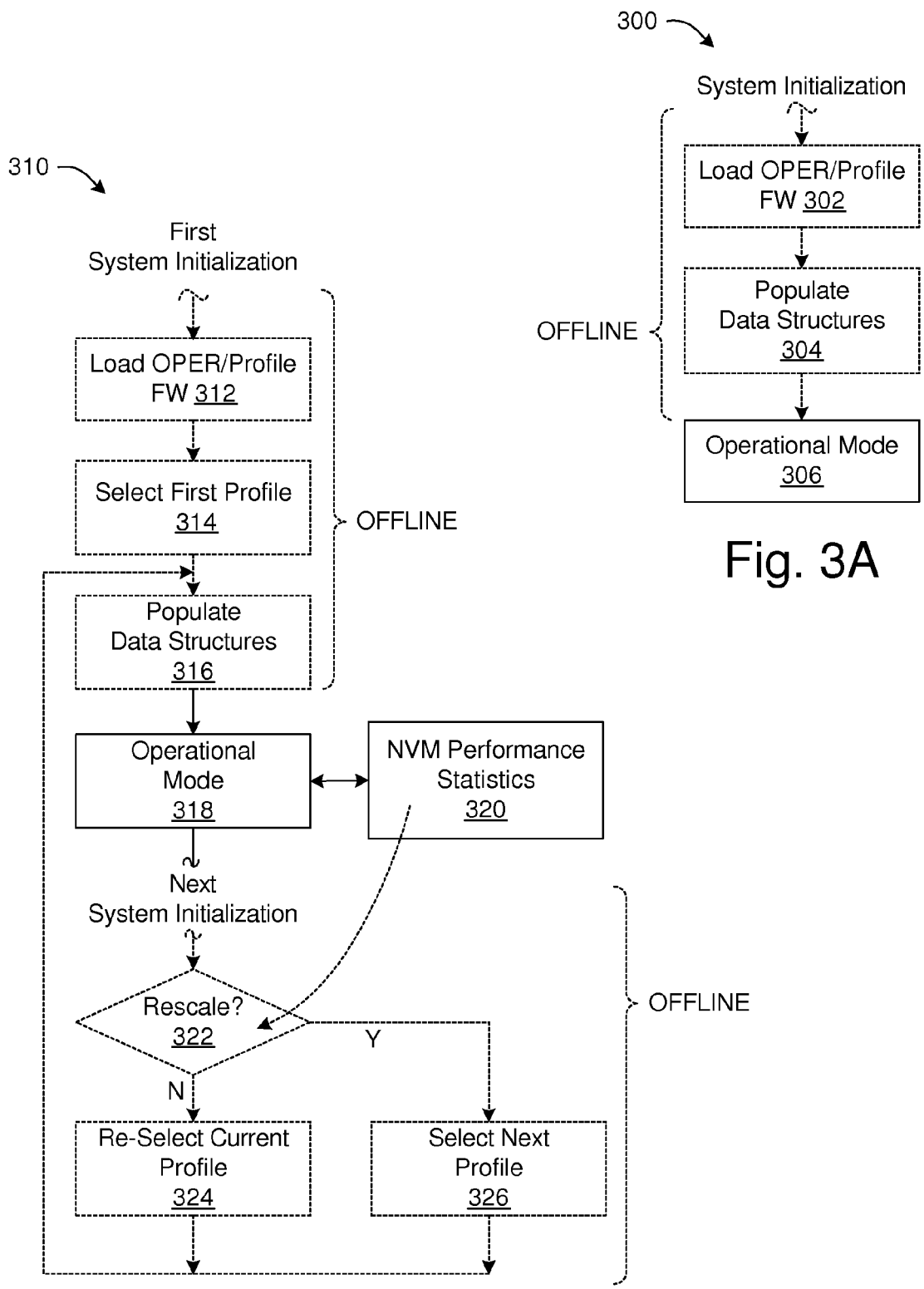
FIG. 3A illustrates selected details of an embodiment of loading and using a static profile of FIG. 2B.
FIG. 3B illustrates selected details of an embodiment of loading, using, and rescaling dynamic profiles of FIG. 2B.

FIG. 3A illustrates selected details of an embodiment of loading and using a static profile of FIG. 2B, designated generally by reference numeral 300. As illustrated, at system initialization an SSD controller (e.g. SSD Controller 100 of FIG. 1A) invokes loading of SSD operational and profile creating firmware (Load OPER/Profile FW 302). Once the firmware has been loaded, execution of the firmware creates scaled (e.g. control) data structures defined by the profile (Populate Data Structures 304). The data structures are used to populate a control RAM (e.g. control RAM 125 of FIG. 1A). In various embodiments, the illustrated operations are carried out offline, as illustrated in FIG. 3A. Once the offline operations are completed, the controller advances to Operational Mode 306 for controlling SSD online operations.

FIG. 3B illustrates selected details of an embodiment of loading, using, and rescaling the dynamic profiles of FIG. 2B, and is designated generally by reference numeral 310. When families of dynamic profiles are used to control operations, individual profiles of the family are used to periodically update to a next profile. The embodiment illustrated by FIG. 3B includes a test for determining, based on NVM age and/or performance criteria, whether it is time to select a next profile of scaled data structures from the dynamic profile family. The tests occur at periodic and/or unpredictable events such as system initializations. An example is the sequence of individual profiles DPA1 221A, then DPA2 221B, and finally DPA3 221C of FIG. 2B. Processing is initiated by a First System Initialization and includes loading operational and profile firmware (Load OPER/Profile FW 312), then selecting a first profile of an appropriate dynamic profile family (Select First Profile of Family 314), and populating profile data structures (Populate Data Structures 316) of the first profile (e.g., DPA1 221A of FIG. 2B) to a control RAM (e.g.

Control RAM 125 of FIG. 1A). Operations 312, 314, and 316 occur offline, and when complete, the controller advances to Operational Mode 318.

In some embodiments, NVM performance is monitored and performance statistics are maintained (Gather NVM Performance Statistics 320), for example Block Error Statistics BES. System initializations following a power-ON event are, in some usage scenarios, infrequent, but occur often enough to use the system initializations as a trigger for testing whether NVM has aged sufficiently or, in other embodiments, NVM performance has declined sufficiently to invoke an advance to a next static profile in the dynamic profile family. Operation continues with a currently selected profile and at a Next System Initialization, the SSD leaves Operational Mode 318, goes offline and the performance statistics are consulted (Rescale? test 322). When the test indicates that the current profile data structures continue to be appropriate for reliable operation, the current profile is re-selected (324 Re-Select Current Profile), the selected profile data structures are again used to populate the control RAM, and the SSD returns to Operational Mode 318. When, on the other hand, the test indicates that the current profile data structures are no longer appropriate for reliable operation, a next profile of the dynamic profile family is selected (Select Next Profile 326). For example, if profile DPA1 221A (FIG. 2B) is a current profile, and the test indicates that time has arrived for selecting a next profile of the dynamic profile family, then profile DPA2 221B is selected and used to populate data structures (Populate Data Structures 316) in the control RAM before the controller returns to Operational Mode 318. Thus Scaled Data Structures 126 of FIG. 1A are periodically rescaled to maintain optimum SSD performance throughout the lifetime of the NVM.

Static Operation

FIG. 4A illustrates an example of scaled static data structures for control and management of the NVM coupled to the SSD controller of FIGS. 1A and 1B, and is designated generally by reference numeral 400. In some embodiments, an SSD includes one or more buffer memories. For example, an optional Device Interface Buffer 402 is located physically closer to NVM interface logic and/or pins and is preferentially used to store NVM read and/or write data. A Control RAM 125 is more centrally located and is preferentially used to store NVM management data, such as a portion of a map, as, for example, Map 141 of FIG. 1A. Continuing the example, in further embodiments, an optional Host Interface Buffer 406 is located near a host interface and is used to buffer and/or store host-related management information and/or some or all host data traffic.

In various embodiments, data structures are allocated to static locations in one of the buffer memories when the SSD is initialized, such as by being powered on and/or reset. Using static allocation reduces a memory footprint and CPU 171 performance overhead of dynamic allocation. In some embodiments, static allocation also ensures that all structures fit in all scenarios; e.g., there are no ordering-based scenarios that a region large enough for a particular one of the data structures is not allocatable, leading to a necessity to re-shuffle locations of the data structures in the buffer memories.

Static allocation does not imply that all data structures are present all of the time. In some embodiments, static allocation implies that space is reserved for all data structures all of the time. For example, space is reserved for a maximum number of entries in a second-level map page cache, and the cache is not fully populated all of the time. Nor does static allocation imply that all data structures have a fixed size in all configurations using a same firmware image. According to various embodiments, firmware code operable at one or more of drive manufacturing, drive formatting, drive reset, or power-on/system initialization is enabled to determine a size and/or a location of each of the statically allocated data structures. The size of each of the statically allocated data structures varies according to one or more of: a size of Control RAM 125; a size of NVM 199; a type of the NVM; parameters of the NVM, such as page size and/or block size; system configuration parameters stored in the NVM; configuration information downloaded from a host; performance targets; power targets; and other similar factors. In some embodiments, the NVM type and/or parameters are available by reading a parameter page and/or internal registers of the NVM. According to various embodiments, at least some of the system configuration parameters are one or more of: stored in the NVM when the SSD is manufactured; and retrievable and/or changeable via a configuration program operating via a host interface and communicating with the firmware image.

Static Data Structures 404 of FIG. 4A provide an example of a static allocation of scaled data structures, such as static profile SPA 218 of FIG. 2B, and Scaled Data Structures 126 of FIG. 1A. Static Data Structures 404 in the example include First Level Map FLM 408A, and FLM extension 408B, Second Level Map Page Cache SPC 410, Read Disturb Count RDC 412, Block Error Statistics BES 414, Free Space Tracking FST 416, such as on an R-block basis, Scratch Space SCRT 418, and Reserved Space 417, space reserved for allocated data structures that are not present.

In some embodiments, at least some data structures are allocated using a particular firmware image in a bit-packed fashion (not illustrated) to maximize utilization of buffer memories. For example, in one NVM configuration, a first-level map entry occupies 27 bits; each entry in the first-level map is stored using exactly 27 bits, resulting in FLM entries that "precess" with respect to byte or other power-of-two boundaries of Control RAM 125. With the same Control RAM and the same firmware image, but with a different NVM configuration (such as a larger amount of NVM), a first-level map entry occupies 28 bits; and each entry in the first-level map is stored using exactly 28 bits. In a similar fashion, as a size of the first-level map entries is changed, a size of second-level map entries is optionally and/or selectively also changed based, at least in part, on NVM configuration.

In various embodiments, a particular firmware image is enabled to statically allocate a plurality of data structures to buffer memories based on configuration parameters, NVM configuration, and other factors, so that in a first configuration a first data structure is of a first size, in a second configuration, the first data structure is of a second size different from the first size, and in both the first configuration and the second configuration the buffer memories are fully utilized (modulo a small amount of space lost due to entries of the data structures being at least a minimum size.

In some embodiments, an SSD supports one or more host interfaces. The host interfaces optionally and/or selectively vary in respective memory requirements (e.g. amount of required on-chip and/or off-chip memory) for data structures. For example, a first host interface requires a set of data structures to manage queues in host memory, and a second host interface requires read data to be buffered in one or more buffer memories for multiple initiators that are enabled to randomly connect and request data. In various embodiments, an SSD supports two or more physical or logical host interfaces that require differing data structure types and/or sizes to be allocated from one or more buffer memories. A particular firmware image is enabled to size and to allocate a plurality of data structures in one or more buffer memories according to one or more of: a type of a host interface; configuration of a host interface; bandwidth of a host interface; throughput of a host interface; and other similar factors.

In some embodiments, at least some data structures are allocated by firmware from one or more buffer memories based on one or more of NVM-related and/or other factors (as above), and further data structures are allocated to fill remaining space in the buffer memories. For example, first data structures (such as RDC, free-space tracking, etc.) having sizes linearly proportional to NVM size (at a given granularity) are allocated based on factors such as NVM size and a desired granularity and/or resolution. Second data structures having fixed sizes (such as scratch space), or having sizes based on configuration parameters (such as a type or a speed of a host interface) are also allocated. Subsequent to allocating the first data structures and the second data structures, third data structures are allocated to fill remaining space in the buffer memories. An example of the third data structures, in some embodiments, is a first-level map and/or a second-level map page cache.

In some embodiments, a size of a first-level map structure and/or a second-level map page cache structure is varied (e.g. adjusted) according to an available amount of buffer storage provided by one or more buffer memories after allocating others of a plurality of data structures. An example of the adjustments is FLM extension 408B of FIG. 4A with the size of the FLM increased. In further embodiments, a number of entries per second-level map page is determined so that the data structures fully utilize the buffer memories, and the number of entries per second-level map pages is not a power-of-two. (A final entry in the first-level map optionally indicates a second-level map page having a smaller number of entries than others of the second-level map pages.) Advantageously, maximizing a number of first-level map entries reduces a number of entries per second-level map page and reduces write amplification due to map updates. Restricting a number of entries in second-level map pages to be a power-of-two fixes a number of entries in the first-level map, resulting in the buffer memories not being fully utilizable in all configurations.

In some embodiments, decisions about which data structures to place into (e.g. on-chip) buffer memories, location, size, and granularity of the data structures, are made off-line external to the SSD and are implemented at time of initialization. In some embodiments, the decisions are implemented as profiles of data structures, and a profile includes directives used by firmware to create the data structures in the buffer memories at time of initialization.

Dynamic Operation

FIG. 4B illustrates an embodiment of sequentially rescaled dynamic data structures for control and management of the NVM coupled to the SSD controller of FIGS. 1A and 1B, for example the Scaled Data Structures 126 of FIG. 1A. The illustration is designated generally by reference numeral 430, and includes horizontal axes 432 and 434, and example Dynamic Data Structures 446A-C. Horizontal axis 432 represents an age of NVM 199 (FIG. 1A), ranging from "New" at the left-hand end, through middle age near the center, to "Worn" at the right-hand end. Horizontal axis 434 indicates duration of specific, active profiles of data structures selected based on NVM age, performance, and related factors at, for example, periodic and/or unpredictable system initializations. The Dynamic Data Structures 446A-C are examples, at particular points in time, of Scaled Data Structures 126 of FIG. 1A.

Along axis 434, Profiles NEW 436A, NORM 436B, and WORN 436C form a dynamic family of profiles of progressively scaled data structures for control and management of NVM 199. A dynamic profile family includes, for example, two or more progressively scaled profiles, as illustrated in FIG. 2B (family DPK1,2 and family DPB1-4).

As illustrated in FIG. 4B, when NVM 199 is new, Profile NEW 436A is selected for populating Control RAM 125 of FIG. 1A with Dynamic Data Structures 446A. Then when the NVM becomes middle aged, Profile NORM 436B is selected for populating Control RAM 125 of FIG. 1A with Dynamic Data Structures 446B. When the NVM is worn and performance has significantly declined, Profile WORN 436C is selected for populating Control RAM 125 with Dynamic Data Structures 446C. In each profile, the data structures are scaled to optimize operational control and management of the NVM based on a determination of NVM age, performance, and related factors.

In some usage scenarios, decisions as to whether to advance to a next profile, as the NVM ages and/or as performance of the NVM declines, occur at relatively infrequent and/or unpredictable power-ON/system reset/system initialization events. As illustrated in FIG. 4B, trigger events (e.g. selected power-ON/system reset/system initialization events) are illustrated as 438A-C and the symbol "P/O". Events that are not trigger events (e.g. non-selected power-ON/system reset/system initialization events) are illustrated as multiple instances of 440 and the symbol "non". For example, in FIG. 3B, a system initialization is used as the trigger event. Though the trigger events occur relatively infrequently and/or unpredictably, the NVM performance tends to degrade slowly over time. As a result, in some operating contexts, the trigger events occur frequently enough to enable adequate monitoring of the NVM performance changes.

An example of data structure rescaling is illustrated in FIG. 4B with respect, e.g., to respective Read Disturb Count structures RDC 454A-C appearing in each of the data structures. Initially, RDC 454A is scaled relatively large in size because when the NVM is relatively new, data being read is more often located adjacent to pages that have seldom or never been written, hence the number of seldom/never-written pages disturbed by a read operation tends to be relatively large, requiring a relatively large Read Disturb Count structure. However, as the NVM ages, fewer reads are of pages located adjacent to seldom/never-written pages. Thus the size of the Read Disturb Count structure is made progressively smaller (as illustrated by RDC 454B and 454C), freeing space for other uses. The reduction in RDC structure size is accomplished by successively invoking Dynamic Data Structures 446B and 446C, each having progressively reduced-size RDC structures.

Conversely, as the NVM ages, more pages become more error prone and stronger error correction techniques are used to ensure continued reliable operation of the SSD. In the example illustrated in FIG. 4B, a portion of Control RAM 125 is devoted to data structures related to error correction of data being written to and read from NVM 191. Thus an ECC work area (Weak ECC work area 458A in Scaled Data Structures 446A) is enlarged (Moderate ECC work area 4580B in Scaled Data Structures 446B) and further enlarged (Strong ECC work area 458C in Scaled Data Structures 446C) as the NVM ages. Similarly, as the NVM ages and performance becomes less reliable, the need for more complete performance statistics gathering increases. Thus the small-sized BES (Block Error Statistics) 456A is increased to a moderate-sized BES 456B and finally to a large-sized BES 456C as the NVM ages and later profiles are selected. The BES data structure includes a list of bad blocks of the NVM that are no longer useable because they have become so unreliable that even strong ECC is no longer able to guarantee reliable operation. As the NVM ages, space to store the list of bad blocks increases. The loss of space to the bad blocks is compensated for to some extent by over-provisioning, e.g., space of the NVM is provided that is not directly addressable by a user. In some embodiments, some of the over-provisioning space is substituted for the bad blocks.

The foregoing discussion of scalable data structures has focused on operational modes with the scaling of active data structures adjusted periodically based on the aging and the decline in performance of NVM, e.g. with respect to FIG. 4B. Parameters such as age and performance are dynamic in that they change over time. There are other parameters that do not, in some circumstances, vary over time. The other parameters are static parameters such as amount of NVM provided (e.g. number/capacity of NVM devices), characteristics of the NVM such as speed and I/O bus size, type and number of host interfaces used and/or provided, configuration of various system components of the operating environment of the SSD storage device, and the like. The static parameters (e.g. specifications) are agreed on and are knowable in advance. The static parameters form the base-line assumptions that later age and performance related adjustments are overlaid. An example application using a one-time-only static profile is a consumer quality laptop computer having an SSD as a replacement for an HDD. An example application that is likely to require performance that is adjusted over time as NVM ages is an enterprise use of an SSD storage device.

Various embodiments dynamically rescale data structures during normal operation, on-the-fly as need arises. Various embodiments estimate, ahead of time and offline, type, size, and precision of data structures that provide a desired reliability and performance of an SSD over an expected lifetime of a chosen NVM. Various embodiments implement various selections of appropriate mixes of management, control, and performance monitoring data structures, placing the selections into one or more related profiles, and loading appropriate profiles using firmware at selected times throughout a lifetime of the chosen NVM, as illustrated in FIG. 4B.

Mapping Operation

Figure 5:
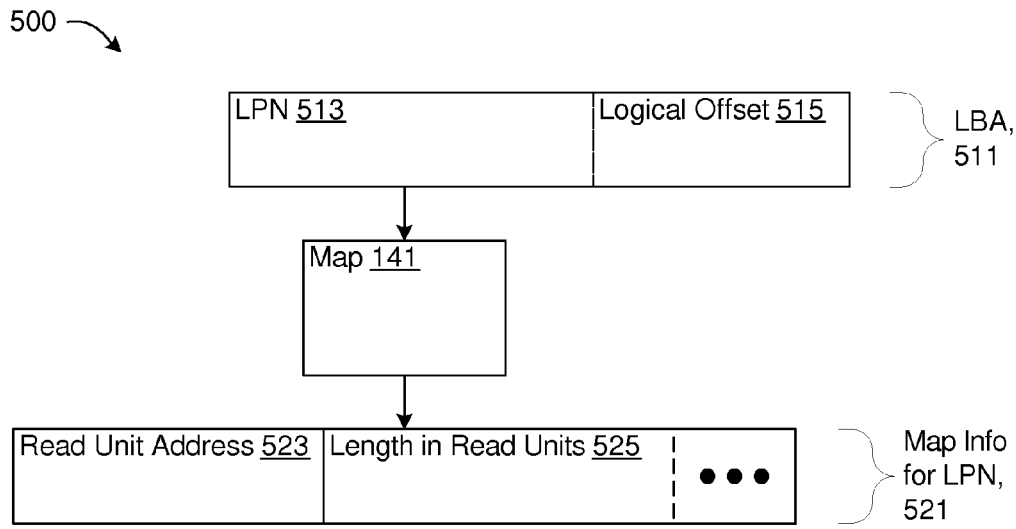
FIG. 5 illustrates selected details of an embodiment of mapping a Logical Page Number (LPN) portion of a Logical Block Address (LBA).

FIG. 5 illustrates selected details of an embodiment of mapping an LPN portion of an LBA, the details designated generally by reference numeral 500. In some embodiments, a read unit is a finest granularity of an NVM that is independently readable, such as a portion of a page of the NVM. In further embodiments, the read unit corresponds to check bits (sometimes-termed redundancy) of a (lower-level) error-correcting code along with all data protected by the check bits. For example, ECC 161 of FIG. 1A implements error correction via check bits such as via an LDPC code, and a read unit corresponds to coding bits implementing the LDPC code in addition to data bits protected by the LDPC coding bits.

In some embodiments, Map 141 maps LPN 513 portion of LBA 511 to Map Info for LPN 521, such as via Table 143 (as illustrated in FIG. 1A). Map info for an LPN (such as Map Info for LPN 521) is sometimes termed a map entry. Map 141 is said to associate an LPN with a corresponding map entry. In various embodiments, mapping is via one or more associative look-ups, via one or more non-associative look-ups, and/or via one or more other techniques.

In some embodiments, SSD Controller 100 maintains one map entry for each LPN potentially and/or actively in use.

In some embodiments, Map Info for LPN 521 includes respective Read Unit Address 523 and Length in Read Units 525. In some embodiments, a length and/or a span are stored encoded, such as by storing the length as an offset from the span, e.g., in all or any portions of Length in Read Units 525. In further embodiments, a first LPN is associated with a first map entry, a second LPN (different from the first LPN, but referring to a logical page of a same size as a logical page referred to by the first LPN) is associated with a second map entry, and the respective length in read units of the first map entry is different from the respective length in read units of the second map entry.

In various embodiments, at a same point in time, a first LPN is associated with a first map entry, a second LPN (different from the first LPN) is associated with a second map entry, and the respective read unit address of the first map entry is the same as the respective read unit address of the second map entry. In further embodiments, data associated with the first LPN and data associated with the second LPN are both stored in a same physical page of a same device in NVM 199.

According to various embodiments, Read Unit Address 523 is associated with one or more of: a starting address in the NVM; an ending address in the NVM; an offset of any of the preceding; and any other techniques for identifying a portion of the NVM associated with LPN 513.

Figure 6:
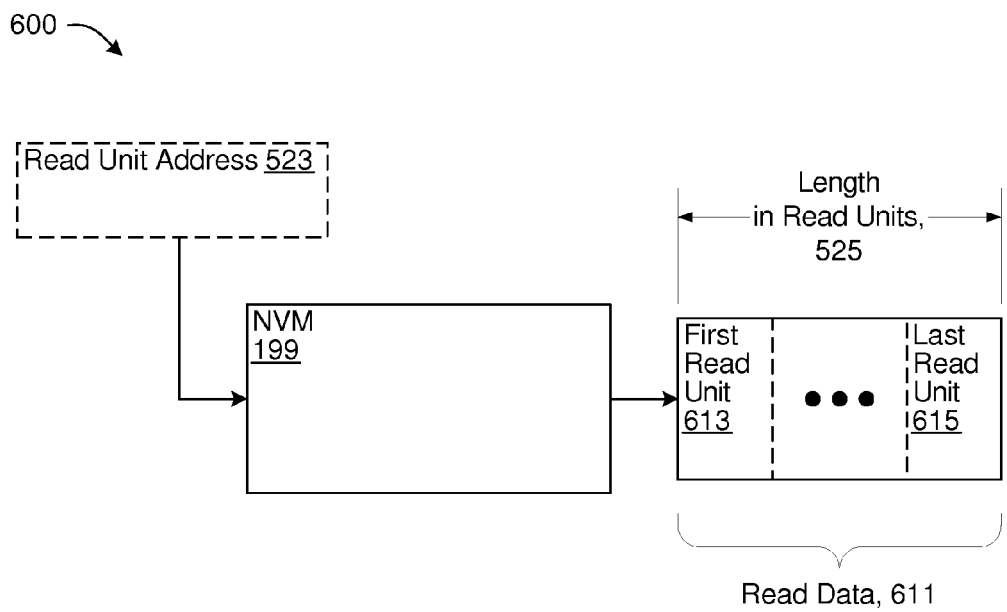
FIG. 6 illustrates selected details of an embodiment of accessing an NVM at a read unit address to produce read data organized as various read units, collectively having a length measured in quanta of read units.

FIG. 6 illustrates selected details of an embodiment of accessing an NVM at a read unit address to produce read data organized as various read units, collectively having a length measured in quanta of read units. The details are designated generally by reference numeral 600. According to various embodiments, First Read Unit 613 is one or more of: a one of read units in Read Data 611 with a lowest address in an address space of the NVM; a fixed one of the read units; an arbitrary one of the read units; a variable one of the read units; and a one of the read units selected by any other technique. In various embodiments, SSD Controller 100 is enabled to access NVM 199 and produce Read Data 611 by reading no more than a number of read units specified by Length in Read Units 525.

Figure 7:
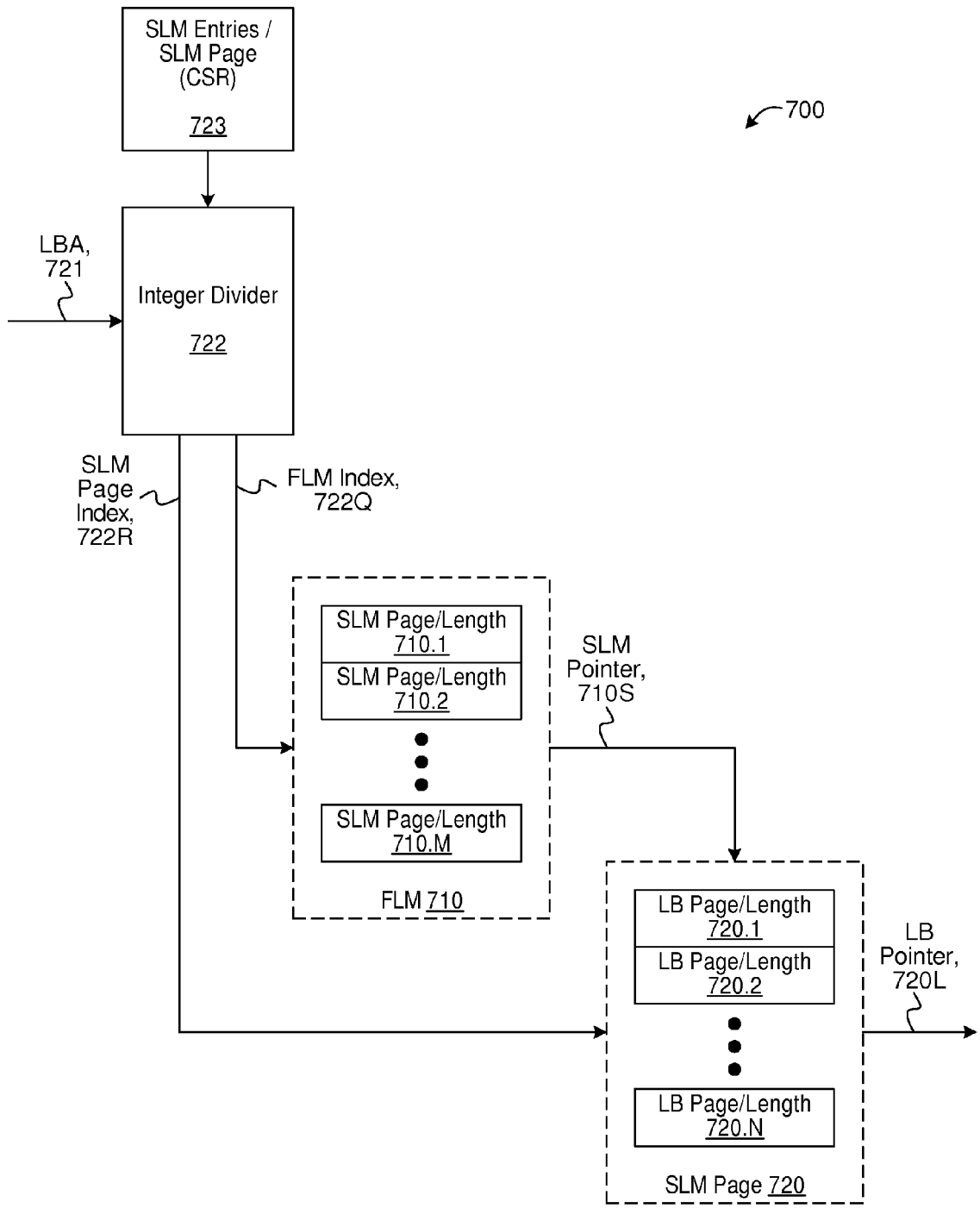
FIG. 7 illustrates selected details of an embodiment of mapping LBAs to Logical Blocks (LBs) stored in an NVM via a two-level map having a First-Level Map (FLM) and one or more Second-Level Map (SLM) pages.

FIG. 7 illustrates, as LBA to NVM Location Mapping 700, selected details of an embodiment of mapping LBAs to LBs stored in an NVM via a two-level map having an FLM and one or more SLM pages. The two-level map is implemented via a first-level element (FLM 710) coupled to one or more second-level elements (illustrated conceptually as a single element SLM Page 720). The FLM includes a plurality of entries (SLM Page/Length 710.1 . . . SLM Page/Length 710.M). Each of the entries of the FLM points to one of the SLM pages (such as SLM Page 720). The SLM page includes a plurality of entries (LB Page/Length 720.1 . . . LB Page/Length 720.N). Each of the entries of the SLM pages points to a location in the NVM where data begins (e.g., a read unit storing at least the beginning of host write data for an LBA). A divider (Integer Divider 722) receives a parameter from, e.g., a programmable hardware register (SLM Entries/SLM Page (CSR) 723), to divide an incoming LBA by to determine which FLM entry to select and which SLM entry (within the SLM page pointed to by the selected FLM entry) to select. The divider is coupled to the FLM and the SLM pages.

In various embodiments, the figure is illustrative of selected details of or related to Map 141 and/or Table 143 of FIG. 1A. For example, in some embodiments, Map 141 and/or Table 143 implement one or more caches of mapping information, such as one or more entries of an FLM and/or one or more entries of an SLM. An entire image of the FLM and/or the SLM is maintained in a portion of NVM (e.g., NVM 199 of FIG. 1A), updated, e.g., when the caches replace a previously cached FLM and/or SLM entry. In some embodiments, the FLM and/or the SLM entire images are implemented via rolling or ping-pong checkpoints, each of the checkpoints being a portion of the respective entire map image.

In operation, LBA 721 is presented to Integer Divider 722. The divider divides the LBA by a number of SLM entries per SLM page, as provided by SLM Entries/SLM Page (CSR) 723, resulting in a quotient (FLM Index 722Q) and a remainder (SLM Page Index 722R). The quotient is used to select one of the FLM entries, and a page field of the selected FLM entry is read (SLM Pointer 710S). The page field is used to select one of the SLM pages (e.g., SLM Page 720), and the remainder is used (e.g., as an offset) to select an entry of the selected SLM page. A page field of the selected SLM page entry is used to select a particular location in the NVM, such as a particular read unit, with at least the beginning of the LB corresponding to the presented LBA is stored (LB Pointer 720L). In various embodiments, the LB pointer includes an address of a read unit of the NVM (e.g., Read Unit Address 523 of FIG. 5). In some embodiments, each of the SLM entries includes a length field (e.g., encoding size and/or span) indicating how many read units to read to obtain all of the data for an LB and/or where within a read unit data for an LB begins (e.g., Length in Read Units 525 of FIG. 5). In some embodiments, each of the FLM entries includes a length field (e.g., encoding size and/or span) indicating how many read units to read to obtain all of the respective SLM page specified by the page field of the FLM entry (e.g., Length in Read Units 525 of FIG. 2).

In various embodiments, the quotient is used as a key to access a cache, such as a fully associative cache of SLM pages. If there is a hit in the cache for a particular SLM page, then a latest copy of the particular SLM page is found in the cache without accessing the NVM. Providing fast access to a plurality of SLM pages enables, in some embodiments and/or usage scenarios, more efficient processing of a plurality of independent streams of sequential data accesses to NVM (e.g., a first stream of sequential data accesses to a first region of LBAs interspersed with a second stream of sequential data accesses to a second region of LBAs).

Additional Implementation/Embodiment Information

In various embodiments, all or any portions of operations and/or functions, such as illustrated by, related to, and/or represented by FIGS. 2A through 7, are implemented, e.g., by one or more state machines. Example implementations of the state machines include hardware (e.g., logic gates and/or circuitry, dedicated state machine circuitry, or hardwired control circuitry), software (e.g., firmware or microcode), or combinations of hardware and software. In some embodiments, one or more of the state machines are implemented at least in part via firmware, one or more drivers, and/or one or more applications. In various embodiments, one or more of the state machines are implemented in part via SSD Controller 100 of FIG. 1A, in part via firmware executed by CPU Core 172, in part via Firmware 106 of FIG. 1B, in part via Driver 107, and/or in part by Application 109.

In various embodiments, all or any portions of operations and/or functions illustrated by, related to, and/or represented by FIGS. 2A through 7 are implemented, e.g., by, under control of, and/or in accordance with any one or more of Coherency Management 179, Translation Management 177, and or Map 141 of FIG. 1A, via any combination of hardware and/or firmware techniques.

Example Implementation Techniques

In some embodiments, various combinations of all or portions of operations performed by a system implementing scaled (e.g. control) data structures for managing non-volatile storage, e.g., with flash memories, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

The embodiments have been described using flash memory devices as one example of NVM of an SSD. Many other types of volatile or NVM devices are applicable and usable in many of the aforementioned embodiments in place of or in addition to flash memory devices, and there are embodiments that use multiple different types of memory devices. Further, the embodiments have been described using an SSD as an example of an electronic component such as a type of I/O device. The techniques described herein are equally applicable to many different electronic components, such as other types of I/O devices, computers, networking equipment, and other forms of electronic equipment.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    via a Solid-State Disk (SSD) controller, communicating with one or more Non-Volatile Memories (NVMs) and populating one or more buffer memories of the SSD controller with one or more data structures comprising management information usable by the SSD controller, the management information comprising map information usable by the SSD controller to map storage addresses of a host to physical addresses of the NVMs;
    further via the SSD controller, scaling at least one of the data structures based at least in part on one or more characteristics of the NVMs, the characteristics comprising one or more operational characteristics and one or more dynamic characteristics, the operational characteristics comprising a selected one of a plurality of storage capacities; and
    determining locations in the data structures based at least in part on a host storage address and a programmable parameter by arithmetically dividing in accordance with a divisor specified at least in part by the programmable parameter, the SSD controller operable to provide storage in accordance with respective first and second ones of the storage capacities when operating in respective first and second storage modes, the first storage capacity being greater than the second storage capacity, the SSD controller further operable to set the programmable parameter to respective first and second values when operating respectively in the first and second storage modes, the first value being greater than the second value.

2. The method of claim 1, wherein the dynamic characteristics comprise age information of the NVMs.

3. The method of claim 1, wherein at least a portion of the map information is allocated to the buffer memories after and in accordance with allocation of at least one other item to the buffer memories.

4. The method of claim 1, wherein:
    the map information is in accordance with a multi-level map;
    the multi-level map comprises a first-level map and a second-level map;
    the map information comprises at least a portion of the first-level map;
    the map information comprises at least a portion of a cached portion of the second-level map; and
    at least a portion of the NVMs stores at least a portion of the second-level map.

5. The method of claim 1, wherein the data structures further comprise any one or more of:
    map information to enable conversion of address information received from a host to physical address information to provide to the NVMs;
    read disturb count information to enable tracking a number of reads to one or more blocks of the NVMs;
    block error statistics to enable tracking error rates of one or more of the blocks;
    free space information;
    management information relating to code rate, capacity and/or status of one or more regions of the NVMs;

one or more read and/or write buffers associated with exchanging information with the host;

one or more traffic management data structures associated with managing traffic with the host;

one or more read and/or write buffers associated with exchanging information with the NVMs;

one or more traffic management data structures associated with managing traffic with the NVMs; and one or more scratch spaces used by the populating of one or more buffer memories of the SSD controller when executing firmware.

6. The method of claim 1, wherein:

the SSD controller comprises an NVM interface enabled to interface to the NVMs, and a host interface enabled to interface to a host;

the buffer memories comprise an NVM buffer memory preferentially used to buffer exchanges with the NVMs and a host buffer memory preferentially used to buffer exchanges with the host;

the SSD controller is implemented in a single integrated circuit; and with respect to physical topology of the single integrated circuit, the NVM buffer memory is located closer to the NVM interface than to the host interface, and the host buffer memory is located closer to the host interface that to the NVM interface.

7. The method of claim 1, wherein the scaling of at least one of the data structures is further based at least in part on the total number of NVM devices in the one or more NVMs with which the SSD controller communicates.

8. The method of claim 1, wherein the scaling of at least one of the data structures allocates static locations in the buffer memories to the data structures selectively in response to an event, and the event comprises any one or more of a power-on event, a reset event, and an initialization event.

9. The method of claim 1, wherein the scaling of at least one of the data structures varies in accordance with any one or more of:

storage capacity of the buffer memories;
storage capacity of the NVMs;
number of the NVMs;
number of die of the NVMs;
total number of NVM devices in the one or more NVMs;
types of each of the NVMs;
parameters of each of the NVMs;
configuration parameters stored in the NVMs;
configuration information downloaded from a host;
performance targets; and
power targets.

10. A system comprising:

a Solid-State Disk (SSD) controller enabled to communicate with one or more Non-Volatile Memories (NVMs), the SSD controller comprising one or more buffer memories and means for populating the buffer memories with one or more data structures comprising management information usable by the SSD controller, the management information comprising map information usable by the SSD controller to map storage addresses of a host to physical addresses of the NVMs;

the SSD controller further comprising means for scaling at least one of the data structures based at least in part on one or more characteristics of the NVMs, the characteristics comprising one or more operational characteristics and one or more dynamic characteristics, the operational characteristics comprising a selected one of a plurality of storage capacities;

the SSD controller further comprising means for determining locations in the data structures based at least in part on a host storage address and a programmable parameter, the means for determining locations operable to arithmetically divide in accordance with a divisor specified at least in part by the programmable parameter, the SSD controller operable to provide storage in accordance with respective first and second ones of the storage capacities when operating in respective first and second storage modes, the first storage capacity being greater than the second storage capacity, the SSD controller further operable to set the programmable parameter to respective first and second values when operating respectively in the first and second storage modes, the first value being greater than the second value.

11. The system of claim 10, wherein the dynamic characteristics comprise age information of the NVMs.

12. The system of claim 10, wherein at least a portion of the map information is allocated to the buffer memories after and in accordance with allocation of at least one other item to the buffer memories.

13. The system of claim 10, wherein the data structures further comprise any one or more of:

map information to enable conversion of address information received from a host to physical address information to provide to the NVMs;

read disturb count information to enable tracking a number of reads to one or more blocks of the NVMs;

block error statistics to enable tracking error rates of one or more of the blocks;

free space information;

management information relating to code rate, capacity and/or status of one or more regions of the NVMs;

one or more read and/or write buffers associated with exchanging information with the host;

one or more traffic management data structures associated with managing traffic with the host;

one or more read and/or write buffers associated with exchanging information with the NVMs;

one or more traffic management data structures associated with managing traffic with the NVMs; and one or more scratch spaces used by the populating of one or more buffer memories of the SSD controller when executing firmware.

14. The system of claim 10, further comprising all or any portions of the NVMs.

15. A Solid-State Disk (SSD) device, comprising one or more Non-Volatile Memories (NVMs) and an SSD controller circuit in communication with the NVMs, the SSD controller circuit configured to populate one or more buffer memories of the SSD controller circuit with one or more data structures comprising management information usable by the SSD controller circuit, the management information comprising map information usable by the SSD controller circuit to map storage addresses of a host to physical addresses of the NVMs, the SSD controller circuit further configured to scale at least one of the data structures based at least in part on one or more characteristics of the NVMs, the characteristics comprising one or more operational characteristics and one or more dynamic characteristics, the operational characteristics comprising a selected one of a plurality of storage capacities, the SSD controller circuit further configured to determine locations in the data structures based at least in part on a host storage address and a programmable parameter by arithmetically dividing in accordance with a divisor specified at least in part by the programmable parameter, the SSD controller circuit further configured to provide storage in accordance with respective first and second ones of the storage capacities when operating in respective first and second storage modes, the first storage capacity being greater than the second storage capacity, the SSD controller circuit further configured to set the programmable parameter to respective first and second values when operating respectively in the first and second storage modes, the first value being greater than the second value.

16. The SSD of claim 15, wherein the dynamic characteristics comprise age information of the NVMs.

17. The SSD of claim 15, wherein at least a portion of the map information is allocated to the buffer memories after and in accordance with allocation of at least one other item to the buffer memories.

18. The SSD of claim 15, wherein the map information is in accordance with a multi-level map comprising a first-level map and a second-level map, the map information comprises at least a portion of the first-level map and at least a portion of a cached portion of the second-level map, and at least a portion of the NVMs stores at least a portion of the second-level map.

19. The SSD of claim 15, wherein the data structures further comprise any one or more of:
  map information to enable conversion of address information received from a host to physical address information to provide to the NVMs;
  read disturb count information to enable tracking a number of reads to one or more blocks of the NVMs;
  block error statistics to enable tracking error rates of one or more of the blocks;
  free space information;
  management information relating to code rate, capacity and/or status of one or more regions of the NVMs;
  one or more read and/or write buffers associated with exchanging information with the host;
  one or more traffic management data structures associated with managing traffic with the host;
  one or more read and/or write buffers associated with exchanging information with the NVMs;
  one or more traffic management data structures associated with managing traffic with the NVMs; and
  one or more scratch spaces used by the population of one or more buffer memories of the SSD controller circuit.

20. The SSD of claim 15, wherein:
  the SSD controller circuit comprises an NVM interface enabled to interface to the NVMs, and a host interface enabled to interface to a host;
  the buffer memories comprise an NVM buffer memory preferentially used to buffer exchanges with the NVMs and a host buffer memory preferentially used to buffer exchanges with the host;
  the SSD controller circuit is implemented in a single integrated circuit having a physical topology such that the NVM buffer memory is located closer to the NVM interface than to the host interface, and the host buffer memory is located closer to the host interface that to the NVM interface.

21. The SSD of claim 15, wherein the scaling of at least one of the data structures is further based at least in part on the total number of NVM devices in the one or more NVMs with which the SSD controller communicates.

22. The SSD of claim 15, wherein the scaling of at least one of the data structures allocates static locations in the buffer memories to the data structures selectively in response to an event, and the event comprises any one or more of a power-on event, a reset event, and an initialization event.

23. The SSD of claim 15, wherein the scaling of at least one of the data structures varies in accordance with any one or more of:
  storage capacity of the buffer memories;
  storage capacity of the NVMs;
  number of the NVMs;
  number of die of the NVMs;
  total number of NVM devices in the one or more NVMs;
  types of each of the NVMs;
  parameters of each of the NVMs;
  configuration parameters stored in the NVMs;
  configuration information downloaded from a host;
  performance targets; and
  power targets.

24. The SSD of claim 15, wherein the SSD controller circuit comprises a programmable processor having associated programming in memory executed by the processor to carry out the populating, scaling, determining locations, providing storage and programmable parameter setting operations.

* * * * *

UNITED STATES PATENT AND TRADEMARK OFFICE
CERTIFICATE OF CORRECTION

Page 1 of 1

PATENT NO. : 9,189,385 B2
APPLICATION NO. : 13/652301
DATED : November 17, 2015
INVENTOR(S) : Earl T. Cohen et al.

It is certified that error appears in the above-identified patent and that said Letters Patent is hereby corrected as shown below:

In the Claims

In Col. 55, line 26
"that to the" should be "than to the"

Signed and Sealed this
Twenty-sixth Day of April, 2016

Michelle K. Lee
*Director of the United States Patent and Trademark Office*